US012406630B2

(12) United States Patent
Monomoshi et al.

(10) Patent No.: US 12,406,630 B2
(45) Date of Patent: Sep. 2, 2025

(54) LUMINANCE CONTROL OF BACKLIGHT IN DISPLAY OF IMAGE

(71) Applicant: NICHIA CORPORATION, Anan (JP)

(72) Inventors: Masahiko Monomoshi, Itano-gun (JP); Taketoshi Nakano, Itano-gun (JP)

(73) Assignee: Nichia Corporation, Anan (JP)

( * ) Notice: Subject to any disclaimer, the term of this patent is extended or adjusted under 35 U.S.C. 154(b) by 0 days.

(21) Appl. No.: 17/677,840

(22) Filed: Feb. 22, 2022

(65) Prior Publication Data

US 2022/0277702 A1 Sep. 1, 2022

(30) Foreign Application Priority Data

Feb. 26, 2021 (JP) ................................ 2021-030121

(51) Int. Cl.
*G09G 3/34* (2006.01)
*G09G 3/36* (2006.01)

(52) U.S. Cl.
CPC ......... *G09G 3/3426* (2013.01); *G09G 3/3611* (2013.01); *G09G 2320/0646* (2013.01); *G09G 2360/16* (2013.01)

(58) Field of Classification Search
None
See application file for complete search history.

(56) References Cited

U.S. PATENT DOCUMENTS

2010/0194791 A1* 8/2010 Ogi .......................... G06T 5/40 345/691
2011/0267379 A1 11/2011 Kurabayashi et al.
2012/0127371 A1 5/2012 Watanabe et al.
2012/0139885 A1* 6/2012 Iwasa .................. G09G 3/3426 345/207
2012/0281028 A1* 11/2012 Orlick .................. G09G 3/3426 345/102
2014/0055505 A1 2/2014 Ikeda et al.
2014/0240201 A1 8/2014 Takahashi et al.
(Continued)

FOREIGN PATENT DOCUMENTS

JP 2004-297439 A 10/2004
JP 2007-310037 A 11/2007
(Continued)

*Primary Examiner* — Benjamin C Lee
*Assistant Examiner* — Emily J Frank
(74) *Attorney, Agent, or Firm* — Kim & Stewart LLP

(57) ABSTRACT

An image display method includes generating luminance data, correcting the luminance data, generating gradation setting data, and controlling a backlight to operate based on the luminance setting data and a liquid crystal panel to operate based on the gradation setting data. The luminance data indicates a luminance value for each light-emitting region of the backlight and is generated based on a maximum gradation value among gradation values of image pixels of an input image that correspond to the light-emitting region. The luminance data is corrected such that, with respect to each light-emitting region, the luminance value is within a predetermined range below a maximum value among the luminance values of neighboring light-emitting regions, and luminance setting data is generated therefrom. The gradation setting data sets a gradation value of each pixel of the liquid crystal panel, and generated based on the input image and the luminance setting data.

20 Claims, 24 Drawing Sheets

(56) References Cited

U.S. PATENT DOCUMENTS

| | | | | |
|---|---|---|---|---|
| 2016/0322005 | A1 | 11/2016 | Umeyama et al. | |
| 2017/0084232 | A1* | 3/2017 | Yang | G09G 3/3426 |
| 2017/0110070 | A1 | 4/2017 | Ikeda et al. | |
| 2018/0047345 | A1* | 2/2018 | Dunn | G02F 1/133603 |
| 2018/0166002 | A1* | 6/2018 | Sako | G09G 3/3607 |
| 2019/0206335 | A1* | 7/2019 | Wu | G09G 3/3426 |
| 2019/0281281 | A1* | 9/2019 | Miyata | H04N 13/344 |
| 2020/0049877 | A1 | 2/2020 | Watanabe et al. | |
| 2020/0105182 | A1* | 4/2020 | Koo | G09G 3/3625 |
| 2020/0202798 | A1* | 6/2020 | Kimbrell | G09G 3/3607 |
| 2021/0104210 | A1* | 4/2021 | Otoi | G09G 5/10 |
| 2021/0390916 | A1* | 12/2021 | Shi | G09G 3/342 |

FOREIGN PATENT DOCUMENTS

| | | | |
|---|---|---|---|
| JP | 2011-232590 | A | 11/2011 |
| JP | 2012-014628 | A | 1/2012 |
| JP | 2012-123100 | A | 6/2012 |
| JP | 2014-044302 | A | 3/2014 |
| JP | 2014-194525 | A | 10/2014 |
| JP | 2015-176137 | A | 10/2015 |
| JP | 2016-163099 | A | 9/2016 |
| JP | 2016-212195 | A | 12/2016 |
| JP | 2017-076110 | A | 4/2017 |
| JP | 2018-101521 | A | 6/2018 |
| WO | 2011/013745 | A1 | 2/2011 |

* cited by examiner

LUMINANCE CONTROL OF BACKLIGHT IN DISPLAY OF IMAGE

CROSS-REFERENCE TO RELATED APPLICATION

This application is based upon and claims the benefit of priority from the prior Japanese Patent Application No. 2021-030121, filed on Feb. 26, 2021; the entire contents of which are incorporated herein by reference.

FIELD

Embodiments relate to an image display method and a display that performs the same.

BACKGROUND

A conventionally-known image display device includes a backlight and a liquid crystal panel. The backlight includes multiple light-emitting regions arranged in a matrix configuration and light sources in the light-emitting regions. The liquid crystal panel is located above the backlight and includes multiple pixels. By using such an image display device, luminances of the light-emitting regions can be set differently depending on an image to be displayed on the liquid crystal panel. Also, gradations of the pixels of the liquid crystal panel can be set according to the set luminances of the light-emitting regions. The contrast of the image can be improved thereby. Such technology is called "local dimming".

A backlight that is used for the local dimming may have a structure in which light can propagate (i.e., leak) between the adjacent light-emitting regions. When a backlight having such a structure is used for the local dimming, the leakage of the light becomes more significant and thus noticeable by users as a difference between setting values of luminances of the adjacent light-emitting regions increases. Such a phenomenon is called a "halo phenomenon".

SUMMARY

Embodiments are directed to an image display method and a display in which the halo phenomenon can be suppressed.

An image display method includes generating luminance data, performing correction of the luminance data, generating gradation setting data, and controlling a backlight to operate based on the luminance setting data and a liquid crystal panel to operate based on the gradation setting data to display an image corresponding to an input image. The luminance data indicates a luminance value for each of a plurality of light-emitting regions of the backlight configured in a matrix form and is generated based on a maximum gradation value among gradation values of image pixels of the input image that correspond to the light-emitting region. The luminance data is corrected such that, with respect to each of the light-emitting regions, the luminance value is within a predetermined range below a maximum luminance value among the luminance values of neighboring light-emitting regions thereof, and luminance setting data is generated therefrom. The gradation setting data sets a gradation value of each of the pixels of the liquid crystal panel for the input image, and generated based on the input image and the luminance setting data.

According to embodiments, the halo phenomenon can be suppressed.

DETAILED DESCRIPTION

Figure 1:
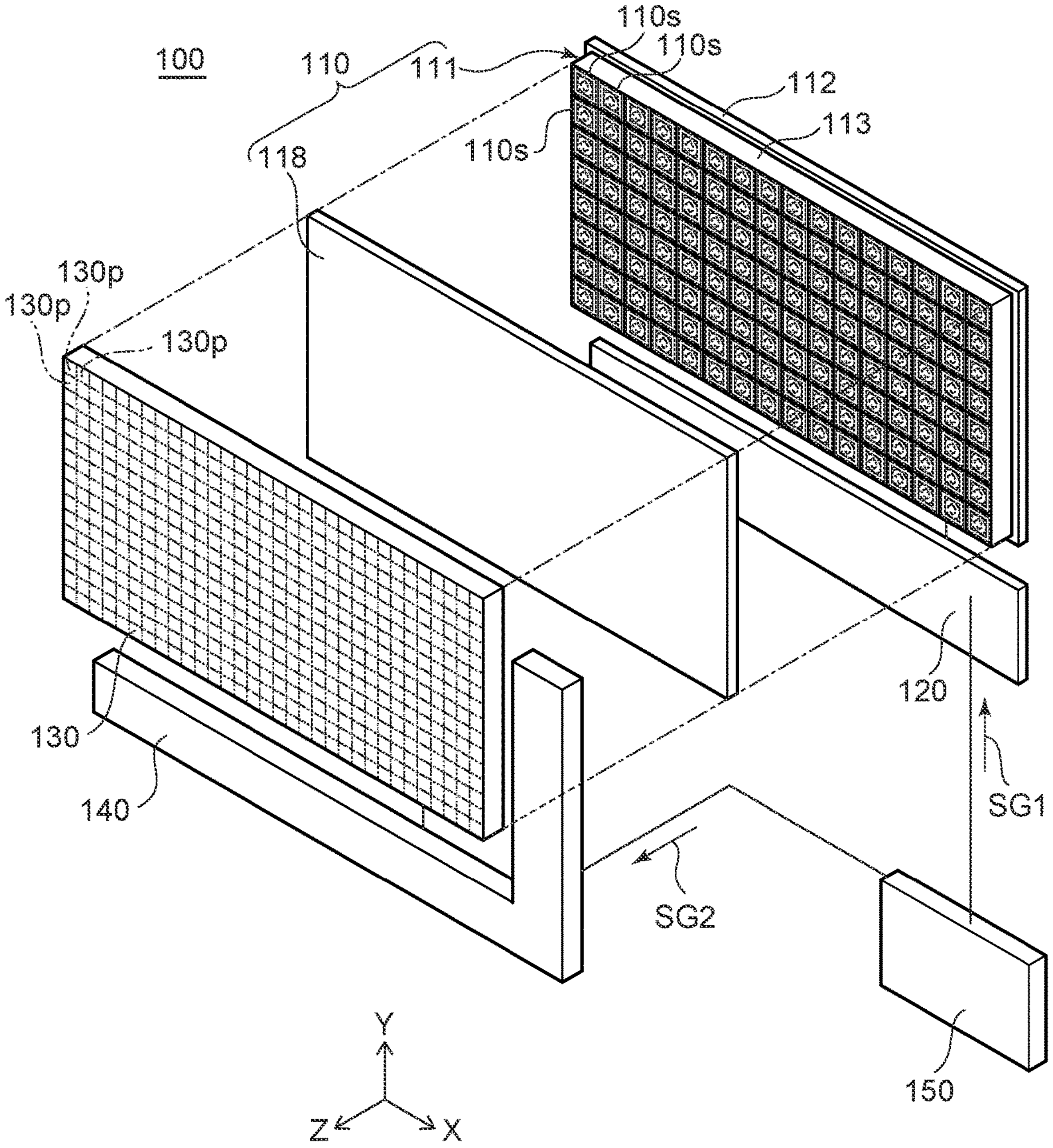
FIG. 1 illustrates an exploded perspective view of an image display device according to a first embodiment.

Exemplary embodiments will now be described with reference to the drawings. The drawings are schematic or conceptual; and the relationships between the thickness and width of portions, the proportional coefficients of sizes among portions, etc., are not necessarily the same as actual values thereof. Furthermore, the dimensions and proportional coefficients may be illustrated differently among the drawings, even for identical portions. In the specification and the drawings of the application, components similar to those described in regard to a drawing hereinabove are marked with like reference numerals, and a detailed description is omitted as appropriate.

For easier understanding of the following description, arrangements and configurations of portions of an image display device are described using an XYZ orthogonal coordinate system. X-axis, Y-axis, and Z-axis are orthogonal to each other. The direction in which the X-axis extends is referred to as an "X-direction"; the direction in which the Y-axis extends is referred to as a "Y-direction"; and the direction in which the Z-axis extends is referred to as a "Z-direction". For easier understanding of the description, the Z-direction is called up, and the opposite direction is called down, but these directions are independent of the direction of gravity. For easier understanding of the description of the drawings, the X-axis direction in the direction of the arrow is referred to as the "+X direction"; and the opposite direction is referred to as the "−X direction". Similarly, the Y-axis direction in the direction of the arrow is referred to as the "+Y direction"; and the opposite direction is referred to as the "−Y direction".

First Embodiment

First, a first embodiment will be described.

FIG. 1 illustrates an exploded perspective view of an image display device according to the first embodiment.

An image display device 100 according to the first embodiment is, for example, a liquid crystal module (LCM) used in a display of a device such as a television, a personal computer, a game machine, etc. The image display device 100 includes a backlight 110, a driver 120 for the backlight, a liquid crystal panel 130, a driver 140 for the liquid crystal panel, and a controller 150. Components of the image display device 100 will be described hereinafter. For easier understanding of the description, the electrical connections between the components are shown by connecting the components to each other with solid lines in FIG. 1.

The backlight 110 is compatible with local dimming. The backlight 110 includes a planar light source 111, and an optical member 118 located on the planar light source 111.

Although not particularly limited, the optical member 118 is, for example, a sheet, a film, or a plate that has a light-modulating function such as a light-diffusing function, etc. According to the present embodiment, the number of the optical members 118 included in the backlight 110 is one. However, the number of optical members included in the backlight may be two or more.

Figure 2:
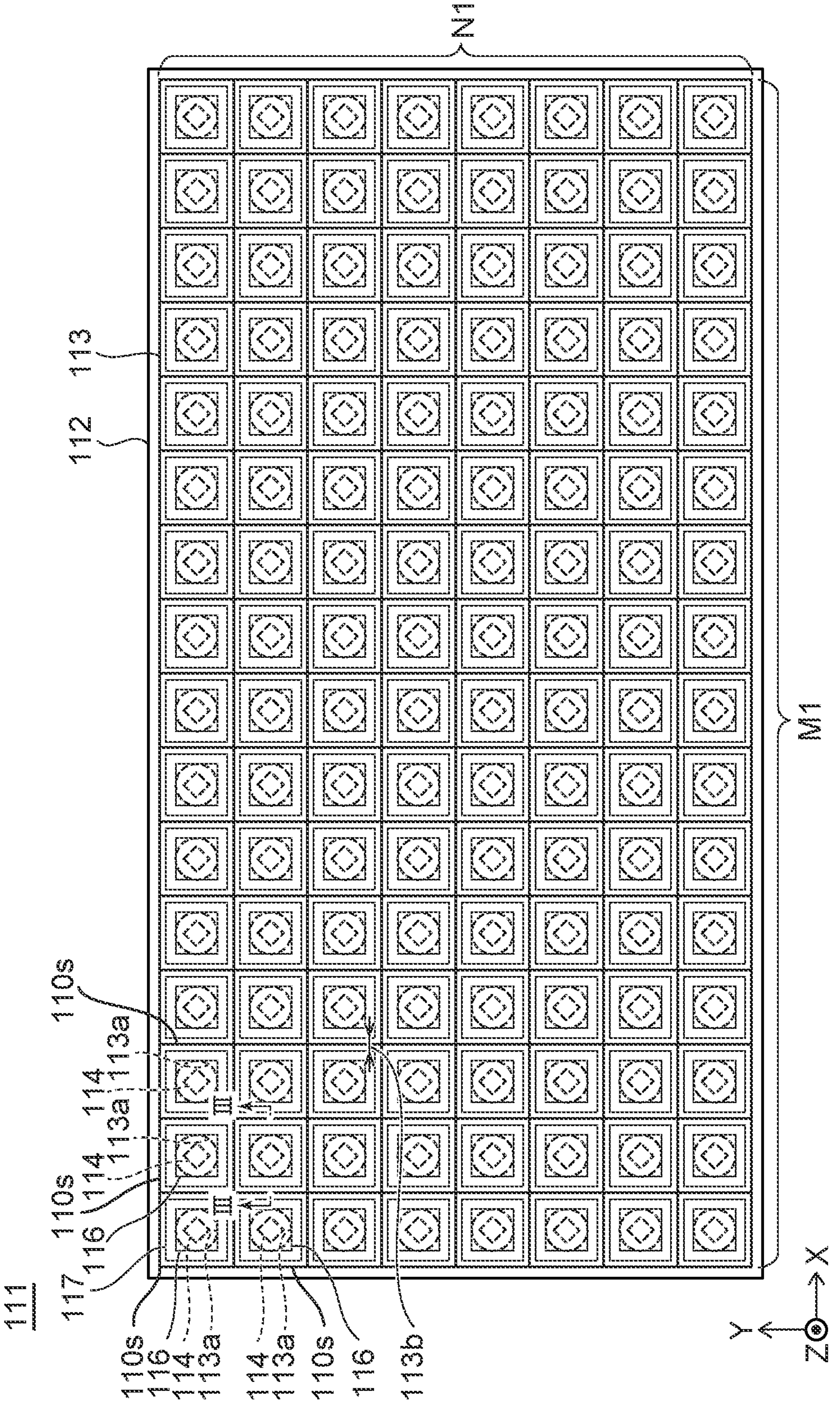
FIG. 2 illustrates a top view of a planar light source of a backlight included in the image display device according to the first embodiment.

FIG. 2 illustrates a top view of the planar light source 111 of the backlight 110 included in the image display device 100 according to the first embodiment.

Figure 3:
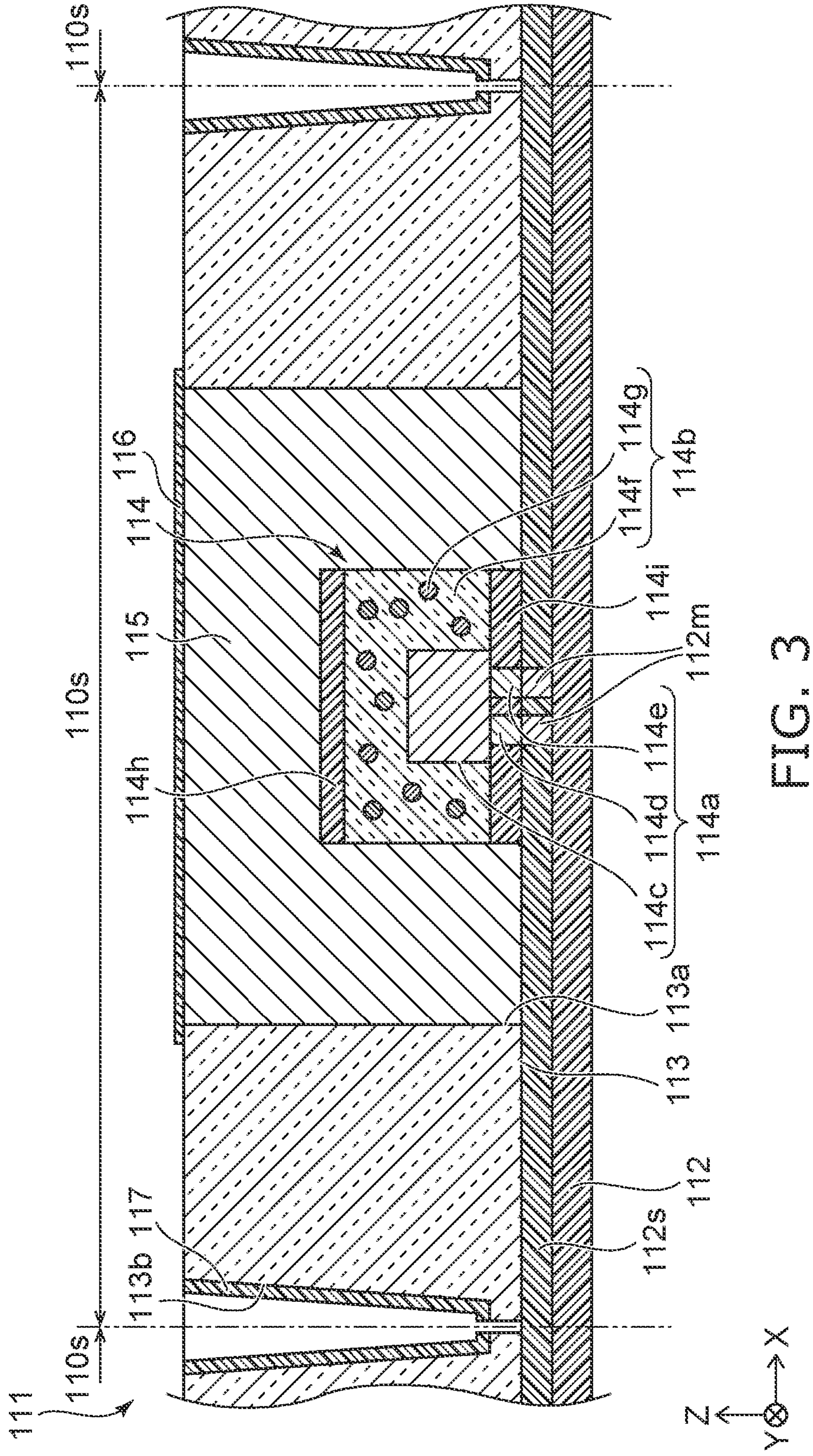
FIG. 3 illustrates a cross-sectional view of the planar light source along line III-III in FIG. 2.

FIG. 3 illustrates a cross-sectional view of the planar light source 111 along line III-III in FIG. 2.

According to the first embodiment as shown in FIGS. 2 and 3, the planar light source 111 includes a substrate 112, a light-reflective sheet **112*s*, a light guide member 113, multiple light sources 114, a light-transmitting member 115, a first light-modulating member 116, and a light-reflecting member 117**.

The substrate 112 is a wiring substrate that includes an insulating member, and multiple wiring located in the insulating member. According to the present embodiment, the shape of the substrate 112 in top-view is substantially rectangular as shown in FIG. 2. However, the shape of the substrate is not limited to the aforementioned shape. The upper surface and the lower surface of the substrate 112 are flat surfaces and are substantially parallel to the X-direction and the Y-direction.

As shown in FIG. 3, the light-reflective sheet **112*s* is located on the substrate 112. According to the present embodiment, the light-reflective sheet 112*s* includes a first adhesive layer, a light-reflecting layer on the first adhesive layer, and a second adhesive layer on the light-reflecting layer. The light-reflective sheet 112*s* is adhered to the substrate 112** with the first adhesive layer.

The light guide member 113 is located on the light-reflective sheet **112*s*. At least a portion of the lower surface of the light guide member 113 is adhered to the light-reflective sheet 112*s* with the second adhesive layer. According to the present embodiment, the light guide member 113 is plate-shaped. The thickness of the light guide member 113 is preferably, for example, not less than 200 μm and not more than 800 μm. In the thickness direction, the light guide member 113 may include a single layer or may include a stacked body of multiple layers. According to the present embodiment, the shape of the light guide member 113 in top-view is substantially rectangular as shown in FIG. 2**. However, the shape of the light guide member is not limited to the aforementioned shape.

For example, a thermoplastic resin such as acrylic, polycarbonate, cyclic polyolefin, polyethylene terephthalate, polyester, or the like, an epoxy, a thermosetting resin such as silicone or the like, and glass, etc., can be used as a material used for the light guide member 113.

Multiple light source placement portions **113*a* are located in the light guide member 113. The multiple light source placement portions 113*a* are arranged in a matrix configuration in top-view. According to the present embodiment, as shown in FIG. 3, each light source placement portion 113*a* is a through-hole that extends through the light guide member 113 in the Z-direction. Alternatively, the light source placement portion 113*a* may be a bottomed recess located at the lower surface of the light guide member 113**.

The light sources 114 are located in the light source placement portions **113*a*, respectively. Accordingly, as shown in FIG. 2, multiple light sources 114 also are arranged in a matrix configuration. However, it is not always necessary for the light guide member 113 to be included in the planar light source 111. For example, the planar light source 111 may not include a light guide member, and the multiple light sources 114 may simply be arranged in a matrix configuration on the substrate 112. When no light guide member is included, the light source placement portion refers to a portion of the substrate 112 in which the light source 114** is located.

Each light source 114 may be a single light-emitting element or may include a light-emitting device in which, for example, a wavelength conversion member or the like is combined with a light-emitting element. According to the present embodiment as shown in FIG. 3, each light source 114 includes a light-emitting element 114*a*, a wavelength conversion member 114*b*, a second light-modulating member 114*h*, and a third light-modulating member 114*i*.

The light-emitting element 114*a* is, for example, an LED (Light-Emitting Diode) and includes a semiconductor stacked body 114*c* and a pair of electrodes 114*d* and 114*e* that electrically connects the semiconductor stacked body 114*c* and the wiring of the substrate 112. Through-holes are provided in portions of the light-reflective sheet 112*s* positioned directly under the electrodes 114*d* and 114*e*. Conductive members 112*m* that electrically connect the substrate 112 and the electrodes 114*d* and 114*e* are located in the through-holes.

The wavelength conversion member 114*b* includes a light-transmitting member 114*f* that covers an upper surface and side surfaces of the semiconductor stacked body 114*c*, and a wavelength conversion substance 114*g* that is located in the light-transmitting member 114*f* and converts the wavelength of the light emitted by the semiconductor stacked body 114*c* into a different wavelength. The wavelength conversion substance 114*g* is, for example, a phosphor.

According to the present embodiment, the light-emitting element 114*a* emits blue light. On the other hand, the wavelength conversion member 114*b* includes, for example, a phosphor that converts incident light into red light (hereinbelow, called a red phosphor) such as a CASN-based phosphor (e.g., $CaAlSiN_3$:Eu), a KSF-based phosphor (e.g., $K_2SiF_6$:Mn), a KSAF-based phosphor (e.g., $K_2(Si, Al)F_6$:Mn), or the like, a phosphor that converts incident light into green light (hereinbelow, called a green phosphor) such as a phosphor that has a perovskite structure (e.g., $CsPb(F, Cl, Br, I)_3$), a β-sialon-based phosphor (e.g., $(Si, Al)_3(O, N)_4$:Eu), a LAG-based phosphor (e.g., $Lu_3(Al, Ga)_5O_{12}$:Ce), etc. Thereby, the backlight 110 can emit white light, which is a combination of the blue light emitted by the light-emitting element 114*a* and the red light and the green light from the wavelength conversion member 114*b*. The wavelength conversion member 114*b* may be a light-transmitting member that does not include any phosphor; in such a case, for example, a similar white light can be obtained by providing a phosphor sheet that includes a red phosphor and a green phosphor on the planar light source.

The second light-modulating member 114*h* is located at an upper surface of the wavelength conversion member 114*b* and can modify the amount and/or the emission direction of the light emitted from the upper surface of the wavelength conversion member 114*b*. The third light-modulating member 114*i* is located at the lower surface of the light-emitting element 114*a* and the lower surface of the wavelength conversion member 114*b* so that the lower surfaces of the electrodes 114*d* and 114*e* are exposed. The third light-modulating member 114*i* can reflect the light oriented toward a lower surface of the wavelength conversion member 114*b* to the upper surface and side surfaces of the wavelength conversion member 114*b*. The second light-modulating member 114*h* and the third light-modulating member 114*i* each can include a light-transmitting resin, a light-diffusing agent included in the light-transmitting resin, etc. The light-transmitting resin is, for example, a silicone resin, an epoxy resin, or an acrylic resin. For example, particles of $TiO_2$, $SiO_2$, $Nb_2O_5$, $BaTiO_3$, $Ta_2O_5$, $Zr_2O_3$, $Y_2O_3$, $Al_2O_3$, ZnO, MgO, $BaSO_4$, glass, etc., are examples of the light-diffusing agent. The second light-modulating member 114*h* may also include a metal member such as, for example, Al, Ag, etc., so that the luminance directly above the light source 114 does not become too high.

The light-transmitting member 115 is located in the light source placement portion 113*a*. The light-transmitting member 115 covers the light source 114. The first light-modulating member 116 is located on the light-transmitting member 115. The first light-modulating member 116 can reflect a portion of the light incident from the light-transmitting member 115 and can transmit another portion of the light so that the luminance directly above the light source 114 does not become too high. The first light-modulating member 116 can include a member similar to the second light-modulating member 114*h* or the third light-modulating member 114*i*.

A partitioning trench 113*b* is provided in the light guide member 113 to surround the light source placement portions 113*a* in top-view. High noticeability of the halo phenomenon can be suppressed by the partitioning trench 113*b* reflecting a portion of the light from the light source 114. The partitioning trench 113*b* extends in a lattice shape in the X-direction and the Y-direction. The partitioning trench 113*b* extends through the light guide member 113 in the Z-direction. Alternatively, the partitioning trench 112*b* may be a recess provided in the upper surface or the lower surface of the light guide member 113. Also, the partitioning trench 112*b* may not be provided in the light guide member 113.

The light-reflecting member 117 is located in the partitioning trench 113*b*. The high noticeability of the halo phenomenon can be further suppressed by the light-reflecting member 117 reflecting a portion of the light from the light source. For example, a light-transmitting resin that includes a light-diffusing agent can be used as the light-reflecting member 117. For example, particles of $TiO_2$, $SiO_2$, $Nb_2O_5$, $BaTiO_3$, $Ta_2O_5$, $Zr_2O_3$, ZnO, $Y_2O_3$, $Al_2O_3$, MgO, $BaSO_4$, glass, etc., are examples of the light-diffusing agent. For example, a silicone resin, an epoxy resin, an acrylic resin, etc., are examples of the light-transmitting resin. For example, a metal member such as Al, Ag, etc., may be used as the light-reflecting member 117. The light-reflecting member 117 covers a portion of side surfaces of the partitioning trench 113*b* in a layer shape. Alternatively, the light-reflecting member 117 may fill the entire interior of the partitioning trench 112*b*. Also, no light-reflecting member may be located in the partitioning trench 112*b*.

According to the present embodiment, light emission of the multiple light sources 114 is individually controllable by the driver 120 for the backlight. Here, "controllable light emission" means that switching between lit and unlit is possible, and the luminance in the lit state is adjustable. For example, the planar light source may have a structure in which the light emission is controllable for each light source, or may have a structure in which multiple light source groups are arranged in a matrix configuration, and the light emission is controllable for each light source group.

In the specification, subdivided regions of the planar light source each of which includes a light source or a light source group that are individually controllable are called "light-emitting regions". In other words, the light-emitting region means the minimum region of the backlight of which the luminance is controllable by local dimming. Accordingly, according to the present embodiment, similarly to the partitioning trench 113*b*, the regions of the planar light source 111 partitioned into a lattice shape correspond to light-emitting regions 110*s*.

Each light-emitting region 110*s* is rectangular. According to the present embodiment, one light source 114 is located in one light-emitting region 110*s*. Then, the luminances of the multiple light-emitting regions 110*s* are individually controlled by the driver 120 for the backlight individually controlling the light emission of the multiple light sources 114. As described above, when the light emission is controlled for each of multiple light source groups, one light source group, i.e., multiple light sources, is located in one light-emitting region; and the multiple light sources are simultaneously lit or unlit.

The multiple light-emitting regions 110*s* are arranged in a matrix configuration in top-view. Hereinbelow, in the structure of a matrix configuration such as that of the multiple light-emitting regions 110*s*, the element group of the matrix of the light-emitting region 110*s*, etc., arranged in the X-direction is called a "row"; and the element group of the matrix of the light-emitting region 110*s*, etc., arranged in the Y-direction is called a "column". For example, as shown in FIG. 2, the row that is positioned furthest in the +Y direction (the row positioned uppermost when viewed according to a direction of reference numerals) is referred to as the "first row"; and the row that is positioned furthest in the −Y direction (the row positioned lowermost when viewed according to the direction of reference numerals) is referred to as the "final row". Similarly, as shown in FIG. 2, the column that is positioned furthest in the −X direction (the column positioned leftmost when viewed according to the direction of reference numerals) is referred to as the "first column"; and the column that is positioned furthest in the +X direction (the column positioned rightmost when viewed according to the direction of reference numerals) is referred to as the "final column". The multiple light-emitting regions 110*s* are arranged in N1 rows and M1 columns. Here, N1 and M1 each are any integer; an example is shown in FIG. 2 in which N1 is 8 and M1 is 16.

Although the partitioning trench 113*b* and the light-reflecting member 117 are included in the planar light source 111 as shown in FIG. 3, the adjacent light-emitting regions 110*s* are not perfectly shielded. Therefore, light can propagate between the adjacent light-emitting regions 110*s*. Accordingly, the light that is emitted by the light source 114 in one light-emitting region 110*s* when the light source is lit may propagate to the adjacent light-emitting regions 110*s* at the periphery of the one light-emitting region 110*s*.

As shown in FIG. 1, the driver 120 for the backlight is connected to the substrate 112 and the controller 150. The driver 120 for the backlight includes a drive circuit that drives the multiple light sources 114. The driver 120 for the backlight adjusts the luminances of the light-emitting regions 110*s* according to backlight control data SG1 received from the controller 150.

Figure 4:
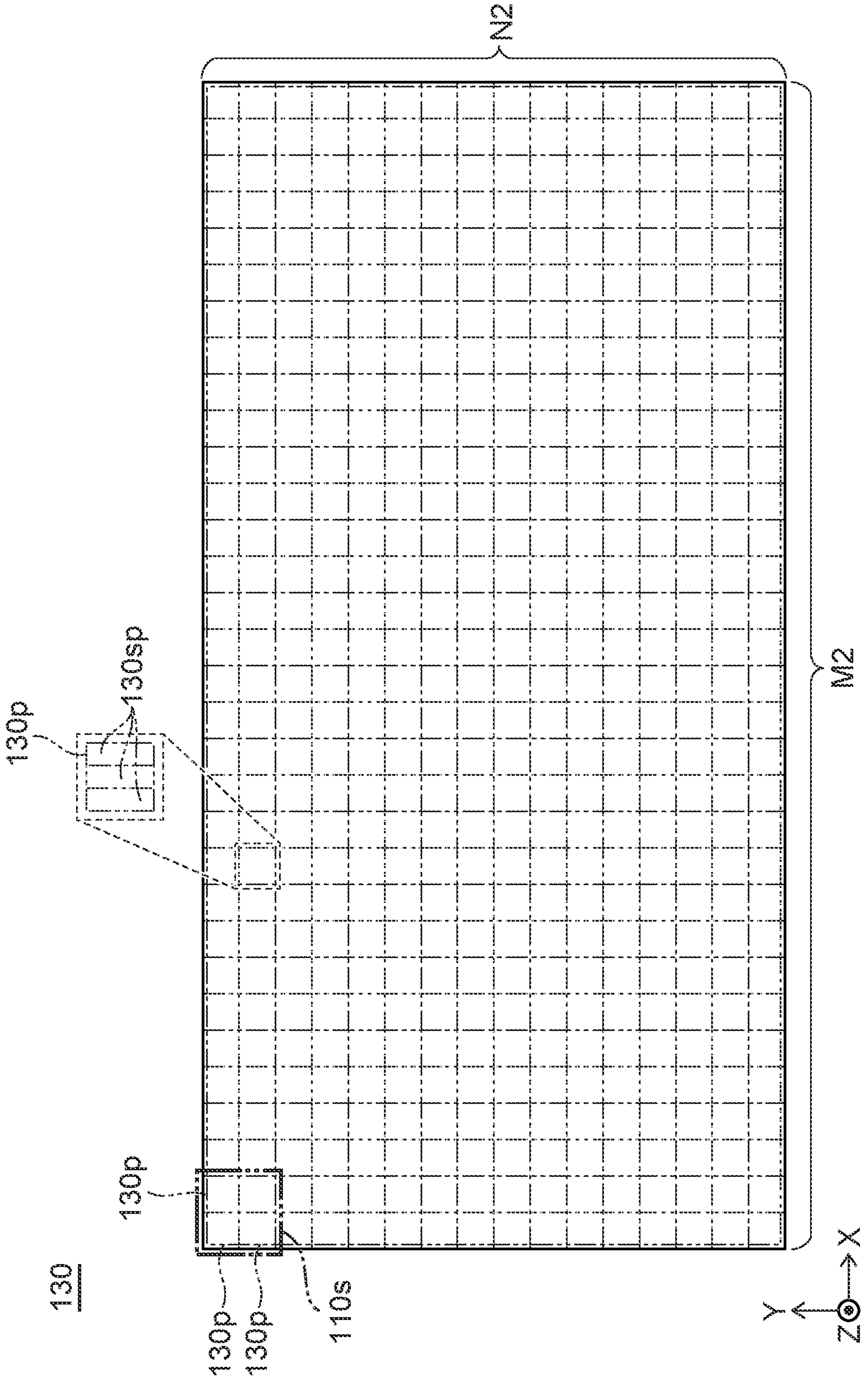
FIG. 4 illustrates a top view of a liquid crystal panel of the image display device according to the first embodiment.

FIG. 4 illustrates a top view of the liquid crystal panel 130 of the image display device 100 according to the first embodiment.

The liquid crystal panel 130 is located on the backlight 110. According to the present embodiment, the liquid crystal panel 130 is substantially rectangular in top-view. The liquid crystal panel 130 includes multiple pixels 130*p* arranged in a matrix configuration. In FIG. 4, one region that is surrounded with a double dot-dash line corresponds to one pixel 130*p*.

The liquid crystal panel 130 according to the present embodiment can display a color image. To achieve this objective, one pixel 130*p* includes three subpixels 130*sp* such that, for example, the white light emitted from the backlight 110 is transmitted to a subpixel that is configured to transmit blue light, a subpixel that is configured to transmit green light, and a subpixel that is configured to transmit red light. The light transmittances of the subpixels 130*sp* are individually controllable by the driver 140 for the liquid crystal panel. The gradations of the subpixels 130*sp* are individually controlled thereby.

The multiple pixels 130*p* are arranged in N2 rows and M2 columns. Here, N2 and M2 each are any integer such that N2>N1 and M2>M1. The multiple pixels 130*p* are located in the light-emitting regions 110*s* in top-view. Although an example is shown in FIG. 4 demonstrates that four pixels 130*p* correspond to one light-emitting region 110*s*, the number of the pixels 130*p* that correspond to one light-emitting region 110*s* may be less than four or more than four.

As shown in FIG. 1, the driver 140 for the liquid crystal panel is connected to the liquid crystal panel 130 and the controller 150. The driver 140 for the liquid crystal panel includes a drive circuit of the liquid crystal panel 130. The driver 140 for the liquid crystal panel adjusts gradations of the pixels 130*p* according to liquid crystal panel control data SG2 received from the controller 150.

Figure 5:
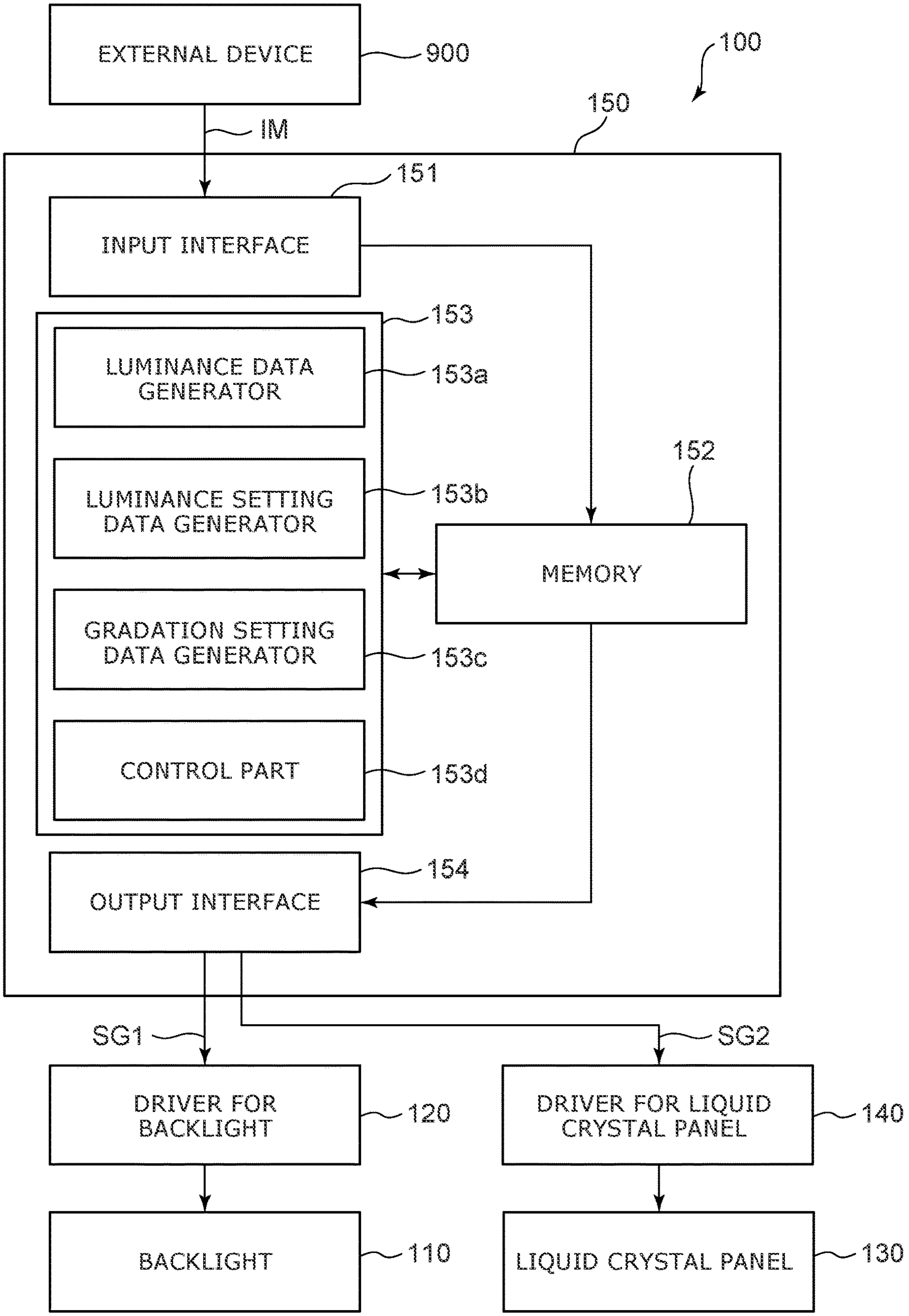
FIG. 5 is a block diagram showing components of the image display device according to the first embodiment.

FIG. 5 is a block diagram showing components of the image display device 100 according to the first embodiment.

According to the first embodiment, the controller 150 includes an input interface 151, memory 152, a processor 153 such as a CPU (central processing unit) or the like, and an output interface 154. These components are connected to each other by a bus.

For example, the input interface 151 is connected to an external device 900 such as a tuner, a personal computer, a game machine, etc. The input interface 151 includes, for example, a connection terminal to the external device 900 such as a HDMI® (High-Definition Multimedia Interface) terminal, etc. The external device 900 inputs an input image IM to the controller 150 via the input interface 151.

The memory 152 includes, for example, ROM (Read-Only Memory), RAM (Random-Access Memory), etc. The memory 152 stores various programs, various parameters, and various data for displaying an image in the liquid crystal panel.

By reading the programs stored in the memory 152, the processor 153 processes the input image IM, determines setting values of luminances of the light-emitting regions 110*s* of the backlight 110 and setting values of the gradations of the pixels 130*p* of the liquid crystal panel 130, and controls the backlight 110 and the liquid crystal panel 130 based on these setting values. Thereby, an image that corresponds to the input image IM is displayed on the liquid crystal panel 130. The processor 153 includes a luminance data generator 153*a*, a luminance setting data generator 153*b*, a gradation setting data generator 153*c*, and a control unit 153*d*.

The output interface 154 is connected to the driver 120 for the backlight. Also, the output interface 154 includes, for example, a connection terminal of the driver 140 for the liquid crystal panel such as a HDMI® terminal, etc., and is connected to the driver 140 for the liquid crystal panel. The driver 120 for the backlight receives the backlight control data SG1 via the output interface 154. The driver 140 for the liquid crystal receives the liquid crystal panel control data SG2 via the output interface 154.

An image display method that uses the image display device 100 according to the present embodiment will be described hereinafter. Functions of the processor 153 as the luminance data generator 153*a*, the luminance setting data generator 153*b*, the gradation setting data generator 153*c*, and the control unit 153*d* also will be described.

Figure 6:
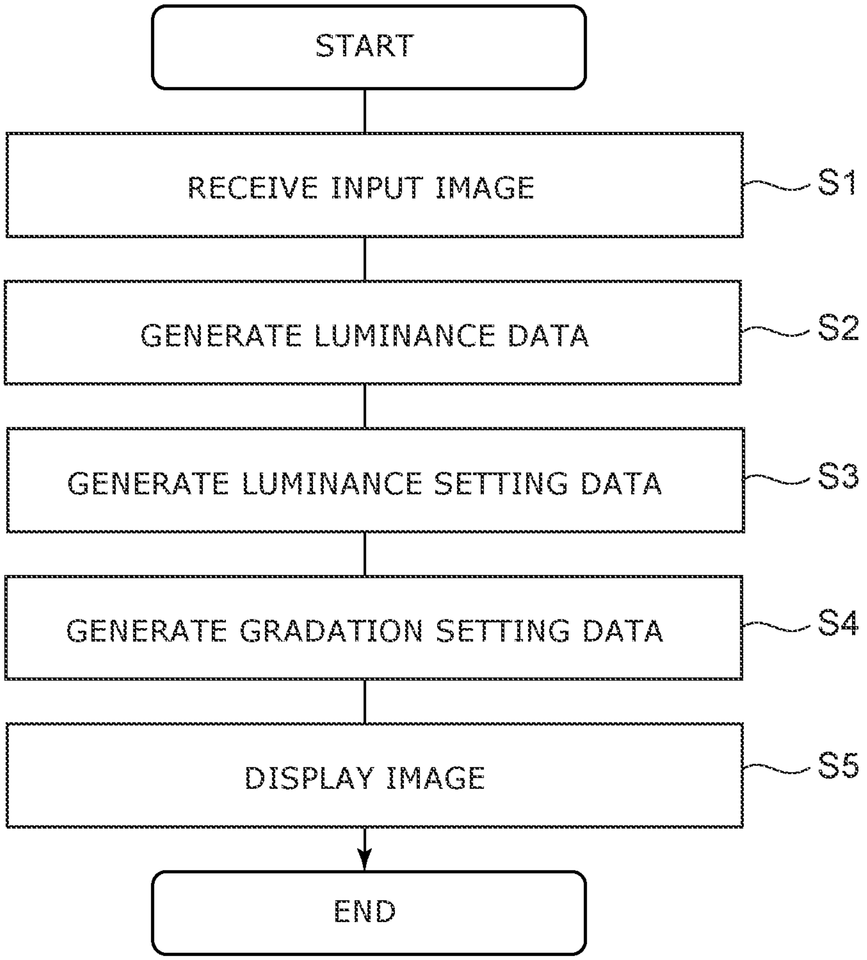
FIG. 6 is a flowchart showing an image display method according to the first embodiment.

FIG. 6 is a flowchart showing an image display method according to the first embodiment.

The image display method according to the first embodiment includes an acquisition process S1 of the input image IM, a generation process S2 of luminance data D1, a generation process S3 of luminance setting data D2, a generation process S4 of gradation setting data D3, and a display process S5 of the image on the liquid crystal panel 130. The processes will now be elaborated. A method of displaying an image corresponding to one input image IM on the liquid crystal panel 130 will be described. When the input images IM are sequentially input to the controller 150 and images that correspond to the input images IM are sequentially displayed on the liquid crystal panel 130, the following process S1 to S5 are repeatedly performed.

First, the acquisition process S1 of the input image IM will be described.

As shown in FIG. 5, the input interface 151 of the controller 150 receives the input image IM from the external device 900. The received input image IM is stored in the memory 152.

Figure 7:
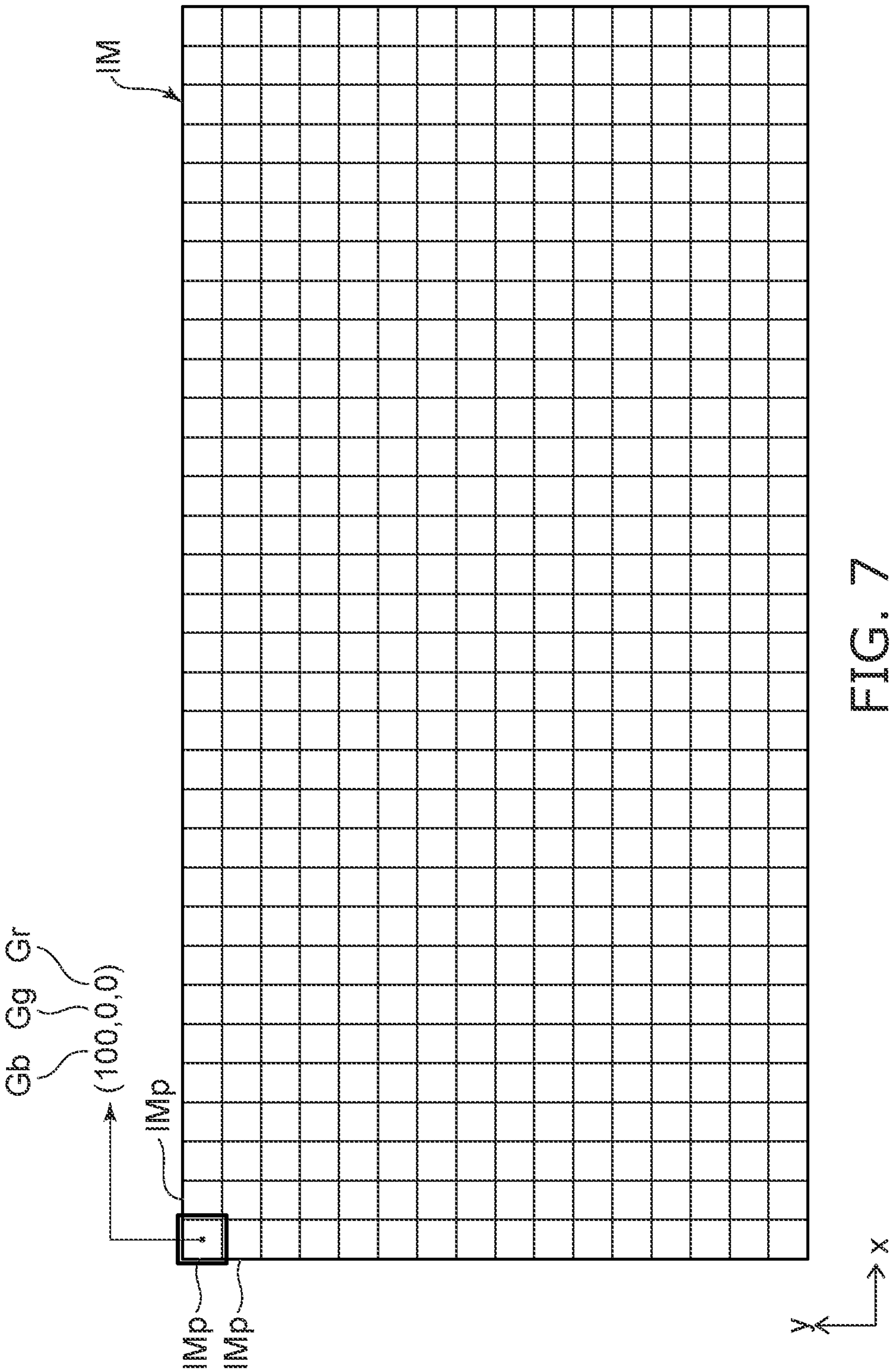
FIG. 7 is a schematic diagram showing an input image input to a controller of the image display device according to the first embodiment.

FIG. 7 is a schematic diagram showing an input image input to the controller 150 of the image display device 100 according to the first embodiment.

Figure 8:
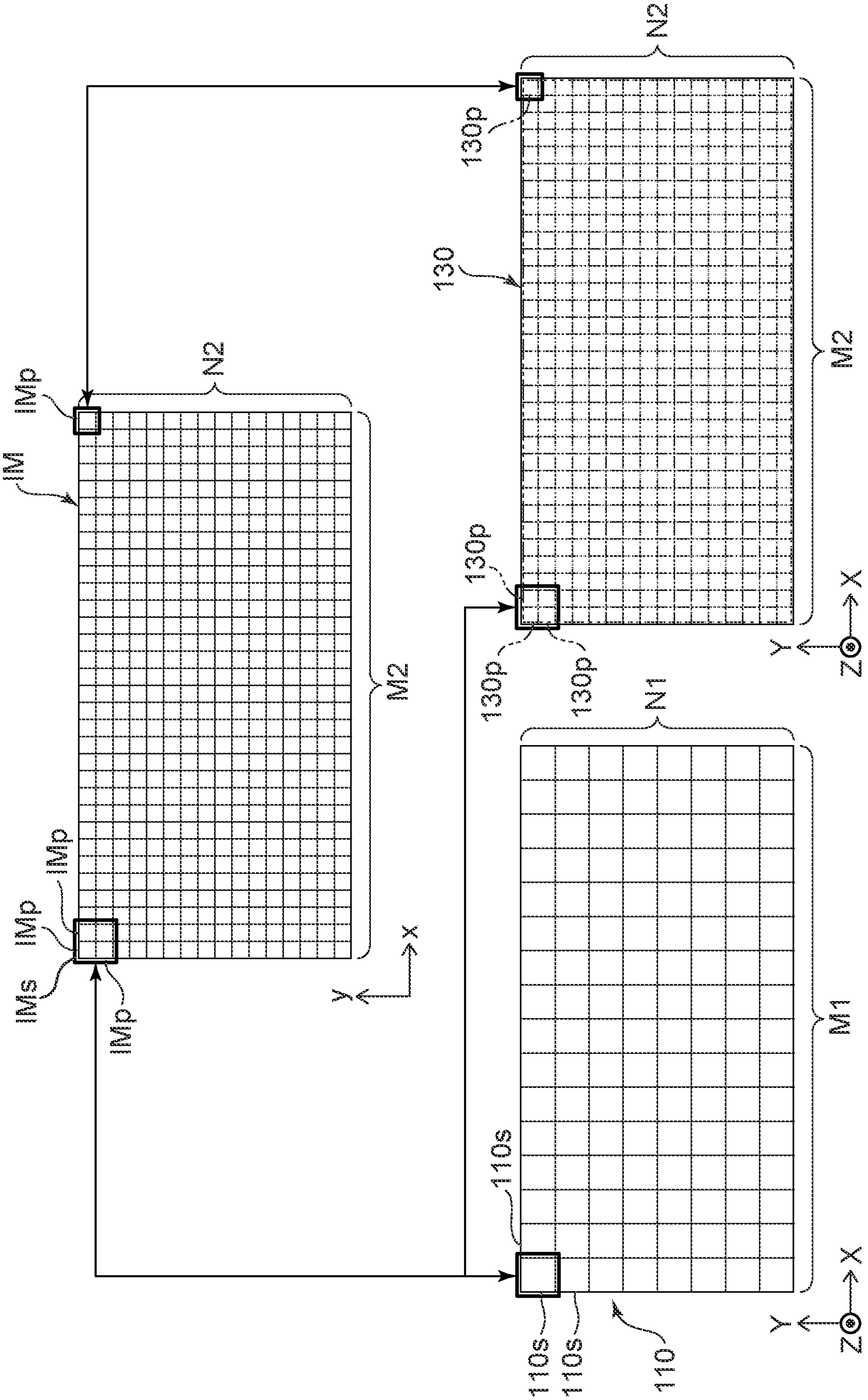
FIG. 8 is a schematic diagram showing a relationship among pixels of the liquid crystal panel, light-emitting regions of the backlight, and pixels of the input image in the first embodiment.

FIG. 8 is a schematic diagram showing a relationship among the pixels of the liquid crystal panel 130, the light-emitting regions of the backlight 110, and pixels of the input image the first embodiment.

The input image IM is data in which gradations are set for multiple pixels (may be referred to as "image pixels") IMp arranged in a matrix configuration. According to the first embodiment, the input image IM is a color image. To achieve this objective, a blue gradation Gb, a green gradation Gg, and a red gradation Gr are set for one pixel IMp. For example, the gradations Gb, Gg, and Gr are represented by numerals from 0 to 255.

For easier understanding of the following description, for example, the arrangement directions of the elements are represented using a xy orthogonal coordinate system for data in which elements such as the pixels IMp or the like are arranged in a matrix configuration as in the input image IM. The x-axis direction in the direction of the arrow is referred to as the "+x direction"; and the opposite direction is referred to as the "−x direction". Similarly, the y-axis direction in the direction of the arrow is referred to as the "+y direction"; and the opposite direction is referred to as the "−y direction". Also, hereinbelow, the element groups of the matrix that are arranged in the x-direction are called a "row"; and the element groups of the matrix that are arranged in the y-direction are called a "column". For example, as shown in FIG. 7, the row that is positioned furthest in the +y direction (the row positioned uppermost when viewed according to a direction of reference numerals) is referred to as the "first row"; and the row that is positioned furthest in the −y direction (the row positioned lowermost when viewed according to the direction of reference numerals) is referred to as the "final row". Similarly, the column that is positioned furthest in the −x direction (the column positioned leftmost when viewed according to the direction of reference numerals) is referred to as the "first column"; and the column that is positioned furthest in the +x direction (the column positioned rightmost when viewed according to the direction of reference numerals) is referred to as the "final column".

For easier understanding of the following description, an example is described in which one pixel IMp of the input image IM corresponds to one pixel 130*p* of the liquid crystal panel 130 as shown in FIG. 8. In other words, according to the present embodiment, the multiple pixels IMp are arranged in N2 rows and M2 columns. Then, multiple pixels IMp are included in an area IMs of the input image IM that corresponds to one light-emitting region 110*s* of the backlight 110. However, the correspondence between the pixels of the input image and the pixels of the liquid crystal panel may not be one-to-one. In such a case, the processor 153 of the controller 150 performs the following processing after performing preprocessing of the input image so that the pixels of the input image and the pixels of the liquid crystal panel correspond one-to-one.

The generation process S2 of the luminance data D1 will now be described.

Figure 9:
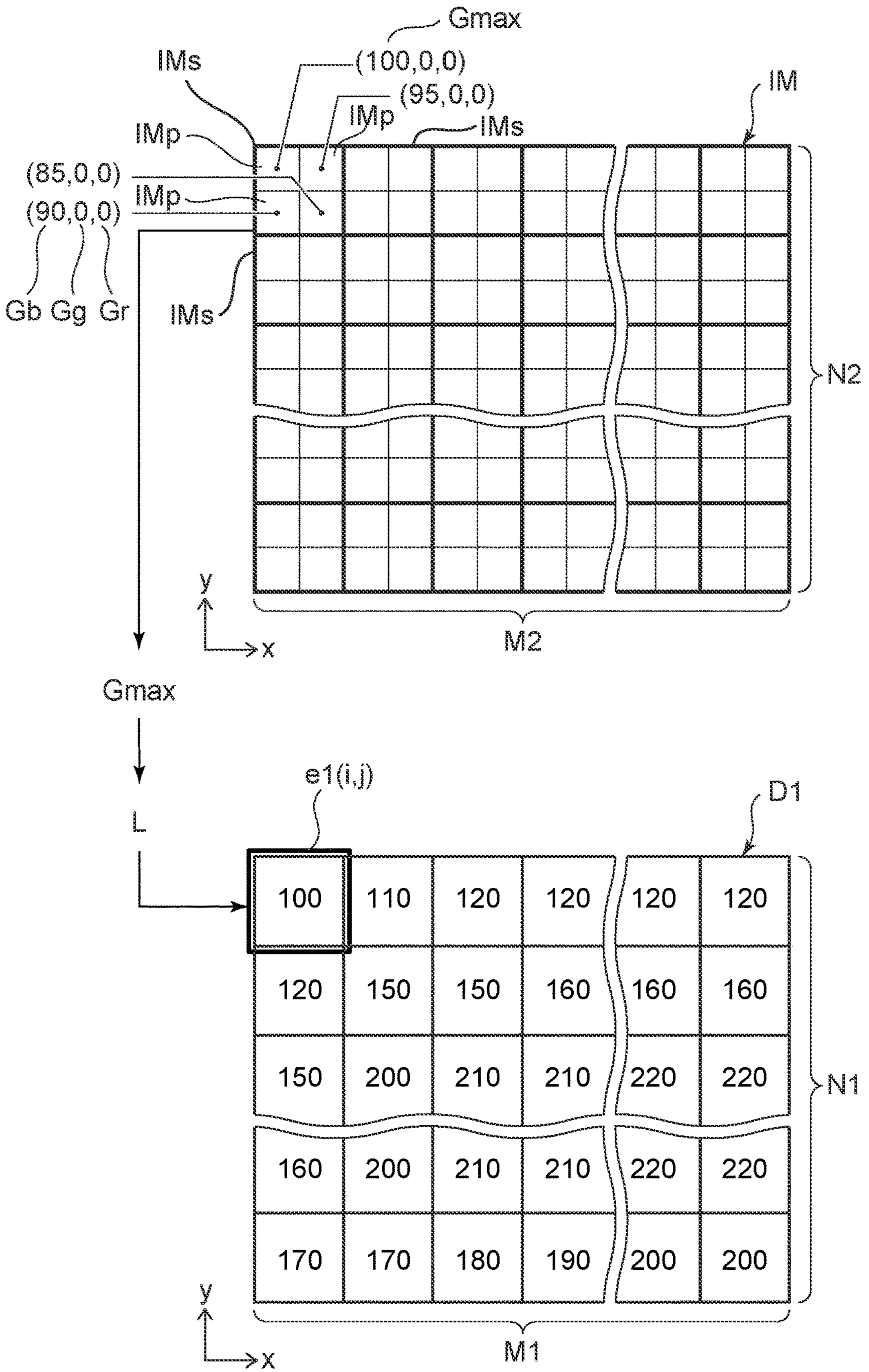
FIG. 9 is a schematic diagram showing a process of generating luminance data in the image display method according to the first embodiment.

FIG. 9 is a schematic diagram showing a process of generating luminance data in the image display method according to the first embodiment.

The luminance data generator 153*a* generates the luminance data D1 including a luminance L converted from a maximum gradation Gmax of the gradations Gb, Gg, and Gr of the multiple pixels IMp with respect to each area IMs of the input image IM corresponding to one light-emitting regions 110*s*.

Specifically, first, the luminance data generator 153*a* determines an area IMs that corresponds to the light-emitting region 110*s* positioned at the ith row and the jth column. Then, the luminance data generator 153*a* uses the maximum value of the red gradation Gr, the green gradation Gg, or the blue gradation Gb of all pixels IMp included in the area IMs as the maximum gradation Gmax of the area IMs. Then, the luminance data generator 153*a* converts the maximum gradation Gmax into the luminance L. Then, the luminance data generator 153*a* uses the luminance L as a value of an element e1($i$, $j$) at the ith row and the jth column of the luminance data D1. Here, i is any integer from 1 to N1, and j is any integer from 1 to M1.

The luminance data generator 153*a* performs this processing for all of the areas IMs.

The luminance data D1 thus obtained is data of a matrix configuration that includes N1 rows and M1 columns. The value of the element e1($i$, $j$) of the luminance data D1 at the ith row and the jth column is the luminance L converted from the maximum gradation Gmax of the area IMs at the ith row and the jth column. In other words, the luminance data D1 is data of a matrix configuration in which the luminance L is set for each area IMs.

The luminance data generator 153*a* stores the luminance data D1 in the memory 152.

Figure 10:
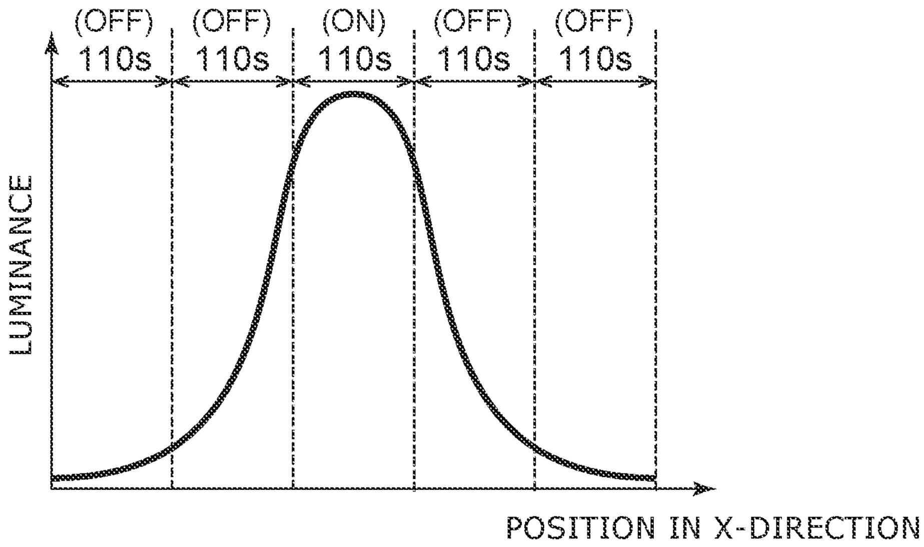
FIG. 10 is a graph showing a luminance distribution when a light source in one light-emitting region is lit in the backlight of the image display device according to the first embodiment.

FIG. 10 is a graph showing a luminance distribution when a light source in one light-emitting region is lit in the backlight of the image display device according to the first embodiment. In FIG. 10, the horizontal axis is the position in the X-direction, and the vertical axis is the luminance.

In FIG. 10, the light-emitting region 110*s* in which the light source 114 is lit is shown as ON, and the light-emitting regions 110*s* in which the light sources 114 are unlit are shown as OFF.

In the planar light source 111 according to the present embodiment, the adjacent light-emitting regions 110*s* are not perfectly shielded. Therefore, when the light source 114 in one light-emitting region 110*s* of the backlight 110 is lit, the light emitted from the light source 114 may propagate to neighboring light-emitting regions 110*s* at the periphery of the one light-emitting region 110*s*. For that reason, when the light source 114 in the one light-emitting region 110*s* is lit and the light sources 114 in the neighboring light-emitting regions 110*s* at the periphery of the one light-emitting region 110*s* are unlit, the luminances of the neighboring light-emitting regions 110*s* at the periphery are not perfectly zero. The leak of the light of the light source 114 in the brighter light-emitting regions 110*s* to the darker neighboring light-emitting regions 110$s$ is highly noticeable as the luminance difference between the adjacent light-emitting regions 110$s$ increases.

In a conventional image display device, the controller converts the luminance data D1 into backlight control data as-is, and controls the driver for the backlight based on the converted backlight control data. Because the luminance data D1 is determined solely according to the input image IM as is, the luminance difference between the adjacent light-emitting regions 110$s$ may be large enough to cause high noticeability of a halo phenomenon depending on the input image IM. In contrast, the image display method according to the first embodiment can suppress the high noticeability of the halo phenomenon by performing the generation process S3 of the luminance setting data D2 that is described below.

The generation process S3 of the luminance setting data D2 will now be described.

Figure 11:
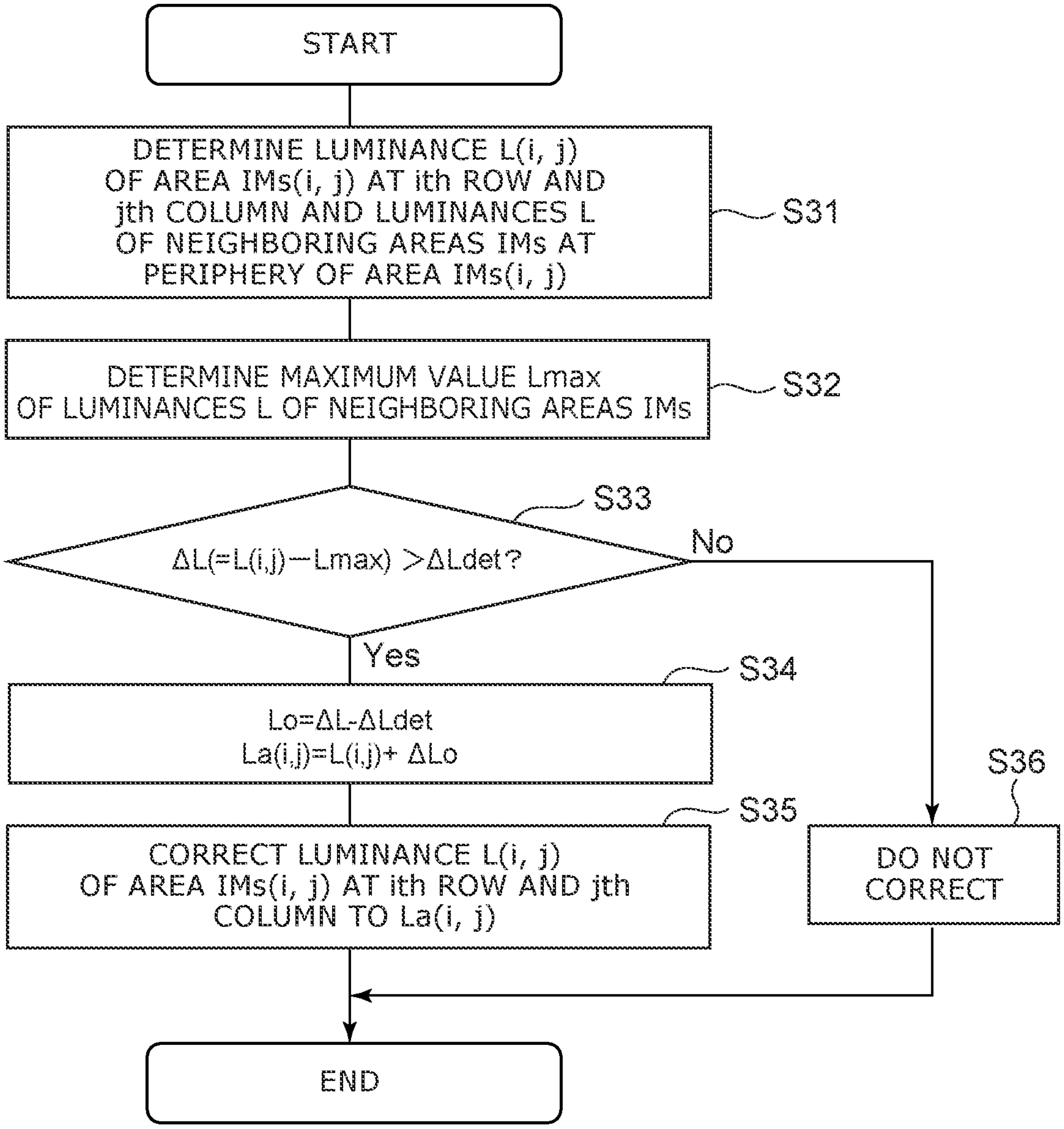
FIG. 11 is a flowchart showing a process of correcting the luminance of one area of the luminance data in the image display method according to the first embodiment.

FIG. 11 is a flowchart showing a process of correcting the luminance of one area of the luminance data in the image display method according to the first embodiment.

FIGS. 12A to 15B are schematic diagrams showing details of the process of generating the luminance setting data in the image display method according to the first embodiment.

Figure 13A:
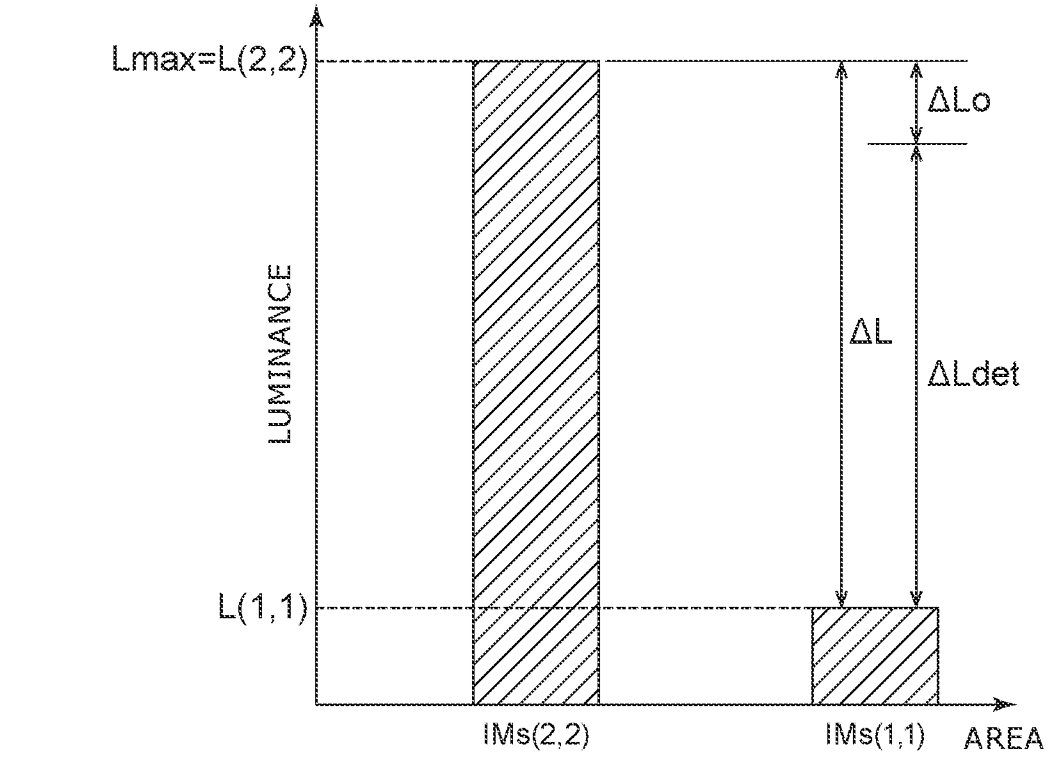
FIGS. 13A and 13B are schematic diagrams showing luminance adjustment in the process of generating the luminance setting data in the image display method according to the first embodiment.
Figure 13B:
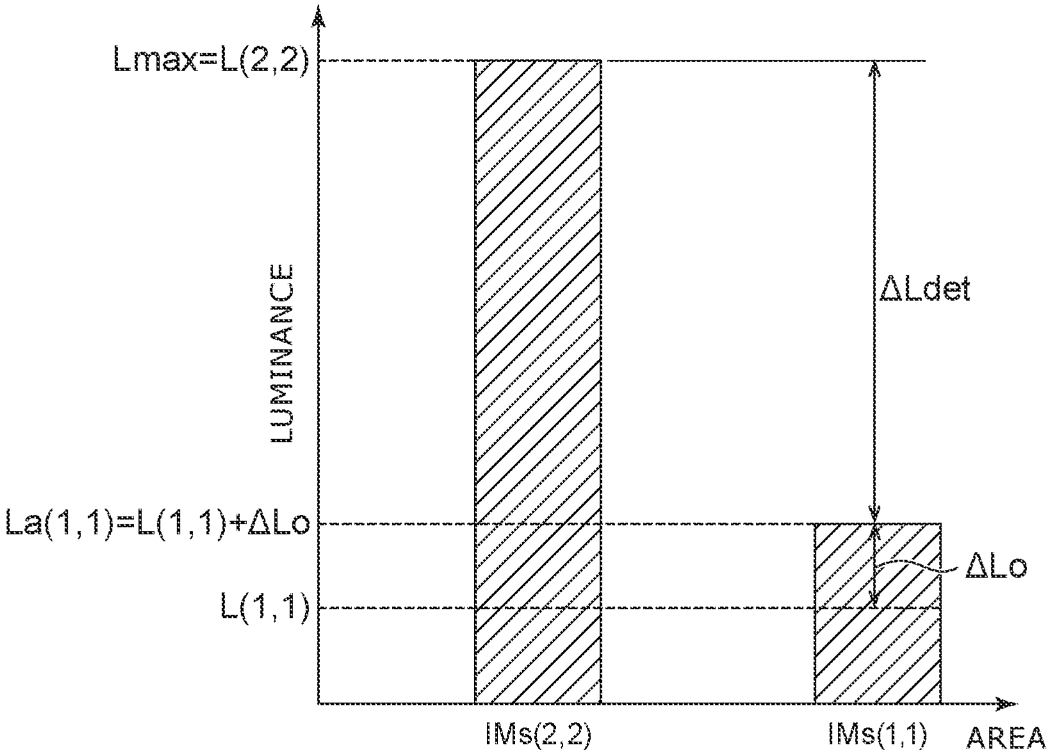

As shown in FIGS. 13A and 13B, the luminance setting data generator 153$b$ generates the luminance setting data D2 including the setting values of the luminances of the light-emitting regions 110$s$ of the backlight 110. The luminance setting data D2 is generated by correcting the luminance data D1 to reduce a luminance difference ΔL by increasing the luminance L of the area IMs that has a lower luminance L among the adjacent areas IMs when a luminance difference ΔL between the adjacent areas IMs of the luminance data D1 is greater than a threshold ΔLdet.

A specific example of the process of generating the luminance setting data D2 will now be described.

For easier understanding of the following description, the area IMs that is at the ith row and the jth column of the luminance data D1 also is called the "area IMs(i, j)". The luminance L of the area IMs at the ith row and the jth column also is called the "luminance L(i, j)".

Figure 12A:
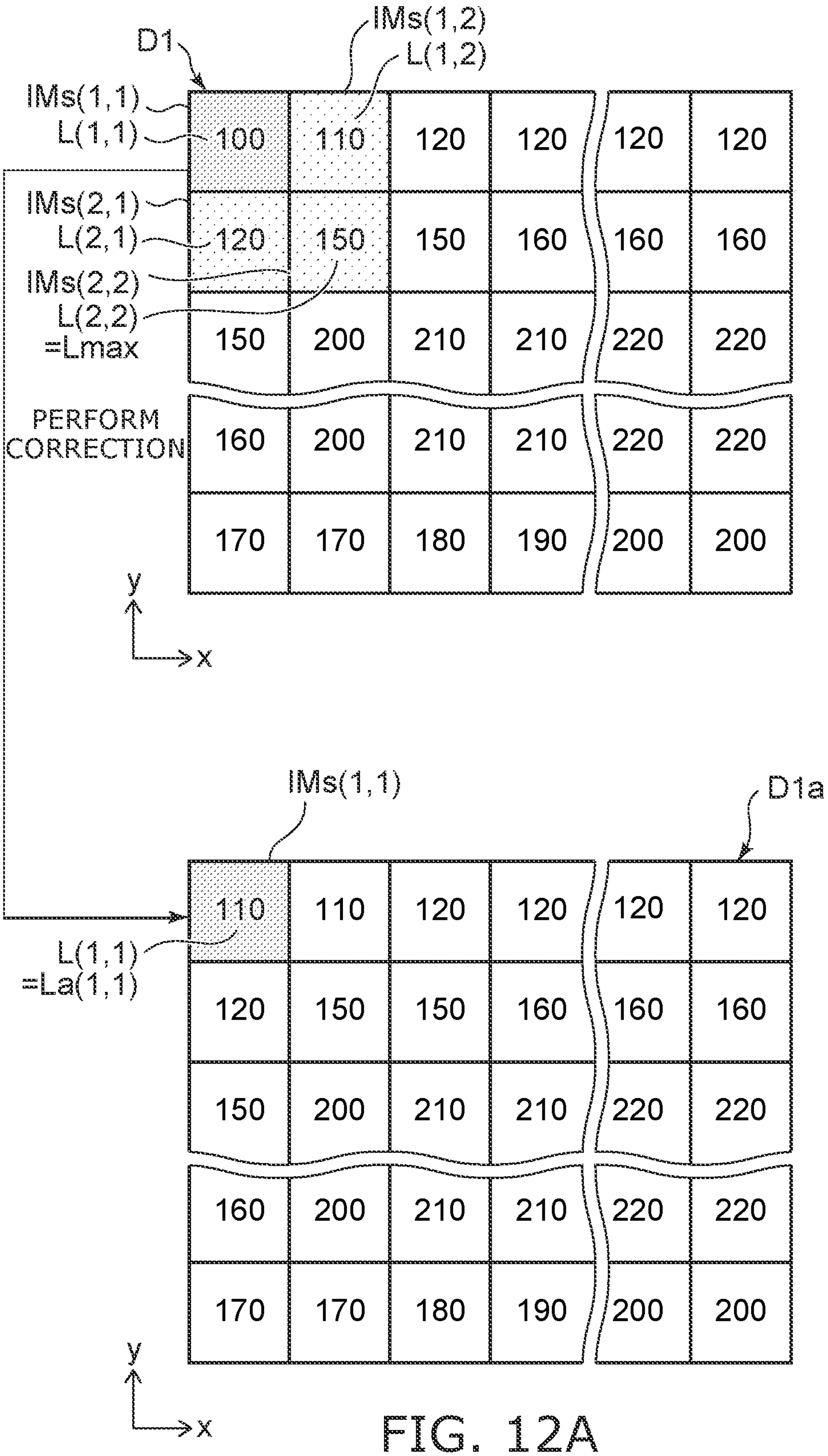
FIGS. 12A, 12B, and 12C are schematic diagrams showing a part of the process of generating luminance setting data in the image display method according to the first embodiment.

First, as shown in FIGS. 11 and 12A, the luminance setting data generator 153$b$ refers to the luminance L(1, 1) of the area IMs(1, 1) at the first row and the first column of the luminance data D1 and the luminances L(1, 2), L(2, 1), and L(2, 2) of the neighboring areas IMs(1, 2), IMs(2, 1), and IMs(2, 2) at the periphery of the area IMs(1, 1) (a process S31).

Then, as shown in FIGS. 11 and 12A, the luminance setting data generator 153$b$ determines a maximum value Lmax of the luminances L(1, 2), L(2, 1), and L(2, 2) of its neighboring areas IMs(1, 2), IMs(2, 1), and IMs(2, 2) at the periphery (a process S32). Here, the luminance L(2, 2) is the maximum value Lmax.

Next, as shown in FIGS. 11 and 13A, the luminance setting data generator 153$b$ calculates the luminance difference ΔL between the maximum value Lmax and the luminance L(1, 1) and determines whether or not the luminance difference ΔL is greater than the threshold ΔLdet (a process S33). In other words, the luminance setting data generator 153$b$ determines whether or not the luminance difference ΔL is greater than the threshold ΔLdet.

The threshold ΔLdet is prestored in the memory 152. According to the present embodiment, the threshold ΔLdet is a value that corresponds to a luminance difference such that a user that visually checks the image display device 100 is less likely to see the halo phenomenon. Although an example in the drawings shows that the threshold ΔLdet is 40, the specific numerical value of the threshold ΔLdet is not limited to 40.

When the luminance difference ΔL is determined to be greater than the threshold ΔLdet (the process S33: Yes), the luminance setting data generator 153$b$ calculates a difference ΔLo between the luminance difference ΔL and the threshold ΔLdet as shown in FIGS. 11 and 13A and calculates a value La(1, 1) by adding the difference ΔLo to the luminance L(1, 1) as shown in FIG. 13B (the process S34). In other words, ΔLo=ΔL−ΔLdet, and La(1, 1)=L(1, 1)+ΔLo. Then, as shown in FIGS. 11 and 12A, the luminance setting data generator 153$b$ replaces the luminance L(1, 1) of the area IMs(1, 1) at the first row and the first column of the luminance data D1 with this value La(1, 1).

When it is determined that the luminance difference ΔL is not more than the threshold ΔLdet (the process S33: No), the luminance setting data generator 153$b$ does not correct the value of the luminance L(1, 1) as shown in FIG. 11 (the process S36). Hereinbelow, the luminance data D1 on which the processing of the processes S31 to S35 or the processes S31 to S34 and S36 is performed is called "corrected data D1$a$".

Figure 12B:
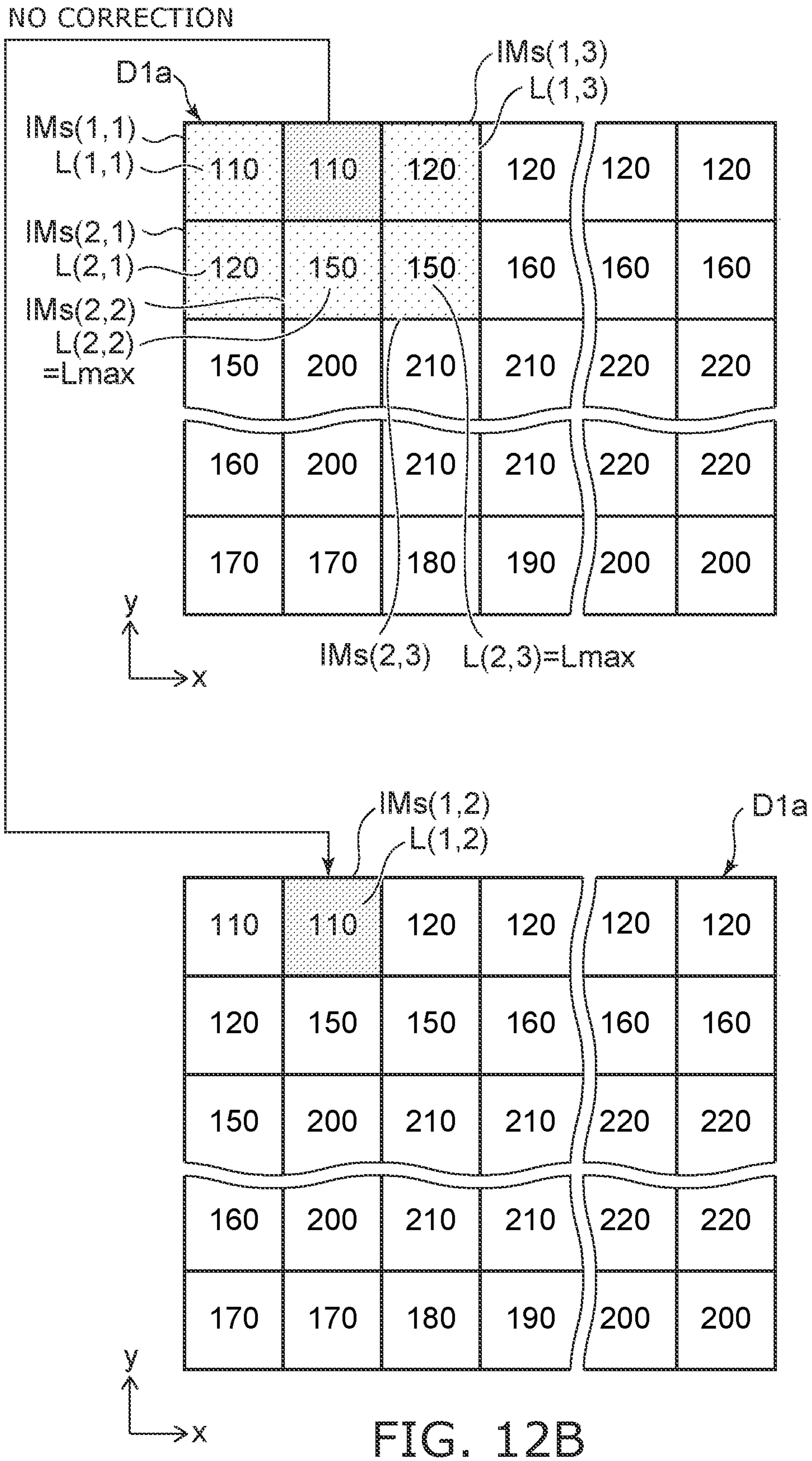

Then, as shown in FIG. 12B, the luminance setting data generator 153$b$ refers to the luminance L(1, 2) of the area IMs(1, 2) at the first row and the second column of the corrected data D1$a$ and the luminances L(1, 1), L(1, 3), L(2, 1), L(2, 2), and L(2, 3) of its neighboring areas IMs(1, 1), IMs(1, 3), IMs(2, 1), IMs(2, 2), and IMs(2, 3) at the periphery of the area IMs(1, 2) (the process S31).

Next, as shown in FIGS. 11 and 12B, the luminance setting data generator 153$b$ calculates the maximum value Lmax of the luminances L(1, 1), L(1, 3), L(2, 1), L(2, 2), and L(2, 3) of the neighboring areas IMs(1, 1), IMs(1, 3), IMs(2, 1), IMs(2, 2), and IMs(2, 3) at the periphery (the process S32). Here, the luminances L(2, 2) and L(2, 3) are the maximum value Lmax.

Then, as shown in FIG. 11, the luminance setting data generator 153$b$ calculates the luminance difference ΔL between the maximum value Lmax and the luminance L(1, 1) and determines whether or not the luminance difference ΔL is greater than the threshold ΔLdet (the process S33).

When it is determined that the luminance difference ΔL is greater than the threshold ΔLdet (the process S33: Yes), the luminance setting data generator 153$b$ calculates the difference ΔLo between the luminance difference ΔL and the threshold ΔLdet and calculates a value La(1, 2) by adding the difference ΔLo to the luminance L(1, 2) (the process S34). However, the value that is added to the luminance L(1, 2) is not limited to the difference ΔLo and may be any other value. Then, the luminance setting data generator 153$b$ replaces the luminance L(1, 2) of the area IMs(1, 2) at the first row and the second column of the luminance data D1 with this value La(1, 2).

When it is determined that the luminance difference ΔL is not more than the threshold ΔLdet (the process S33:No), the luminance setting data generator 153$b$ does not correct the value of the luminance L(1, 2) as shown in FIG. 11 (the process S36).

In this manner, the luminance setting data generator 153$b$ sequentially shifts the selected area IMs in the +x direction in the corrected data D1$a$, and performs the processing of the processes S31 to S35 or the processes S31 to S33 and S36 for each shift.

Figure 12C:
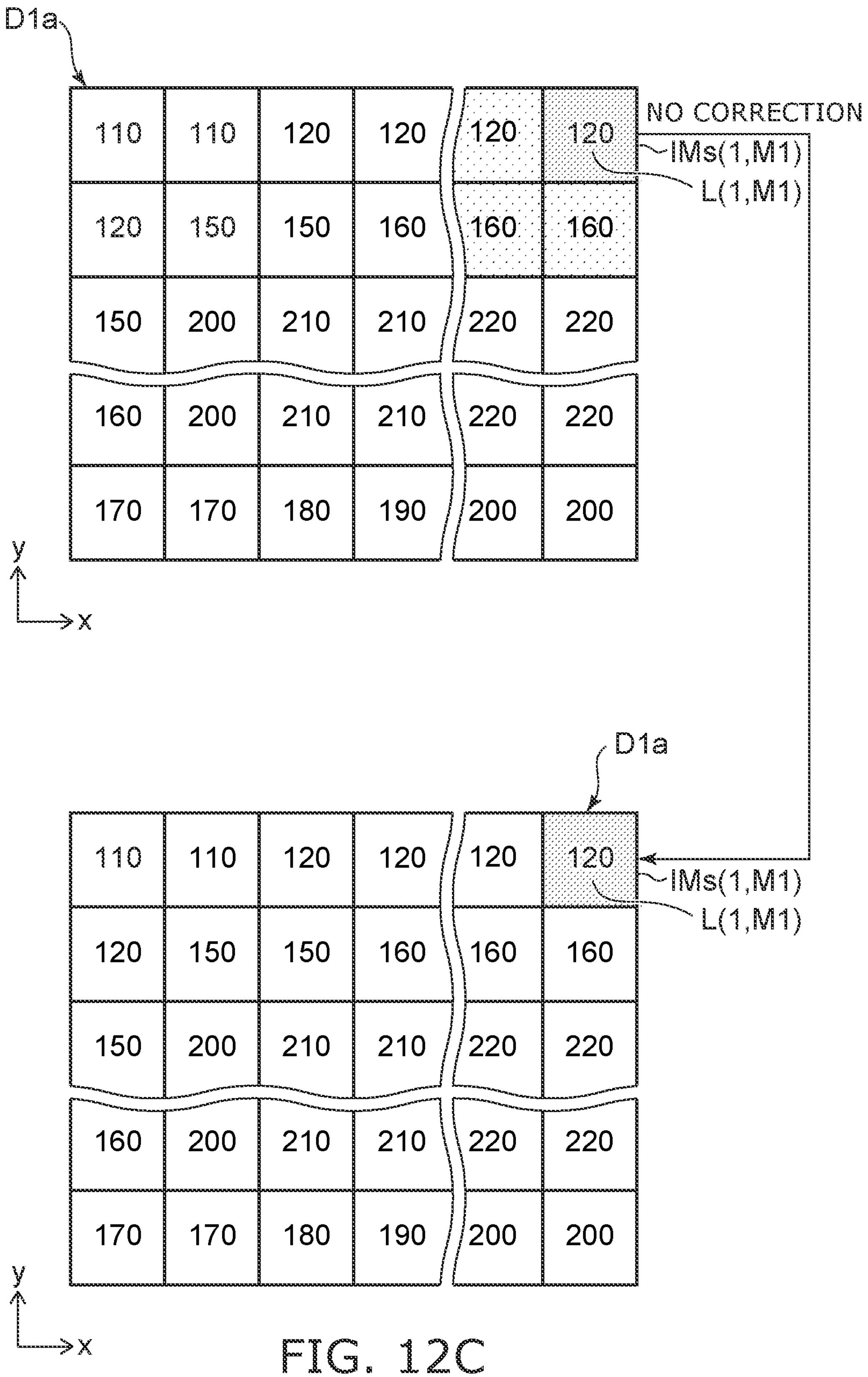
Figure 14A:
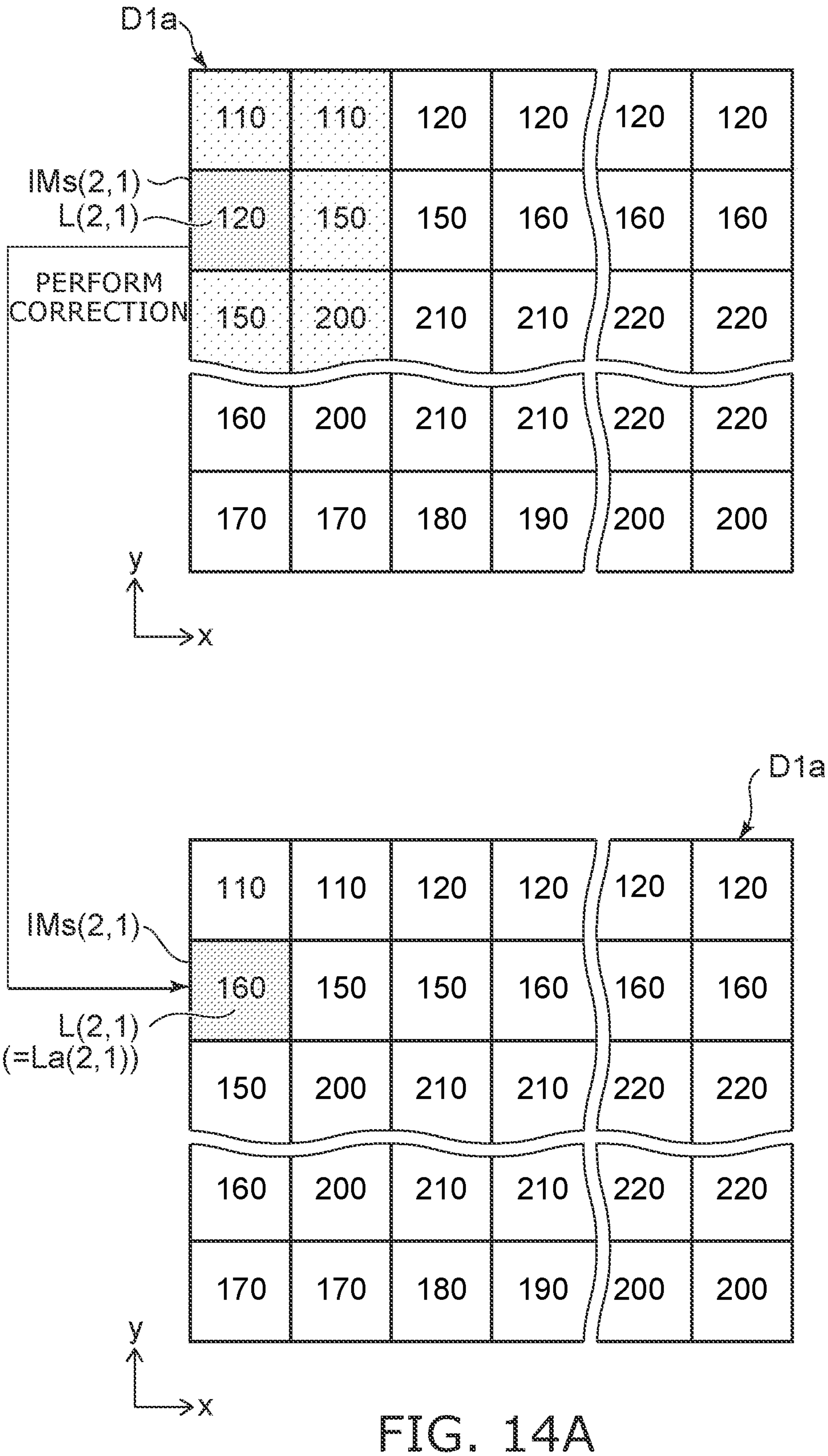
FIGS. 14A and 14B are schematic diagrams showing another part of the process of generating the luminance setting data in the image display method according to the first embodiment.

After the selected area IMs is shifted furthest in the +x direction in the corrected data D1$a$ as shown in FIG. 12C, the luminance setting data generator 153*b* shifts the selected area IMs one row in the −y direction and furthest in the −x direction as shown in FIG. 14A, and performs similar processing. Then, the luminance setting data generator 153*b* sequentially shifts the selected area IMs in the +x direction in the corrected data D1*a* and performs similar processing for each shift.

Figure 14B:
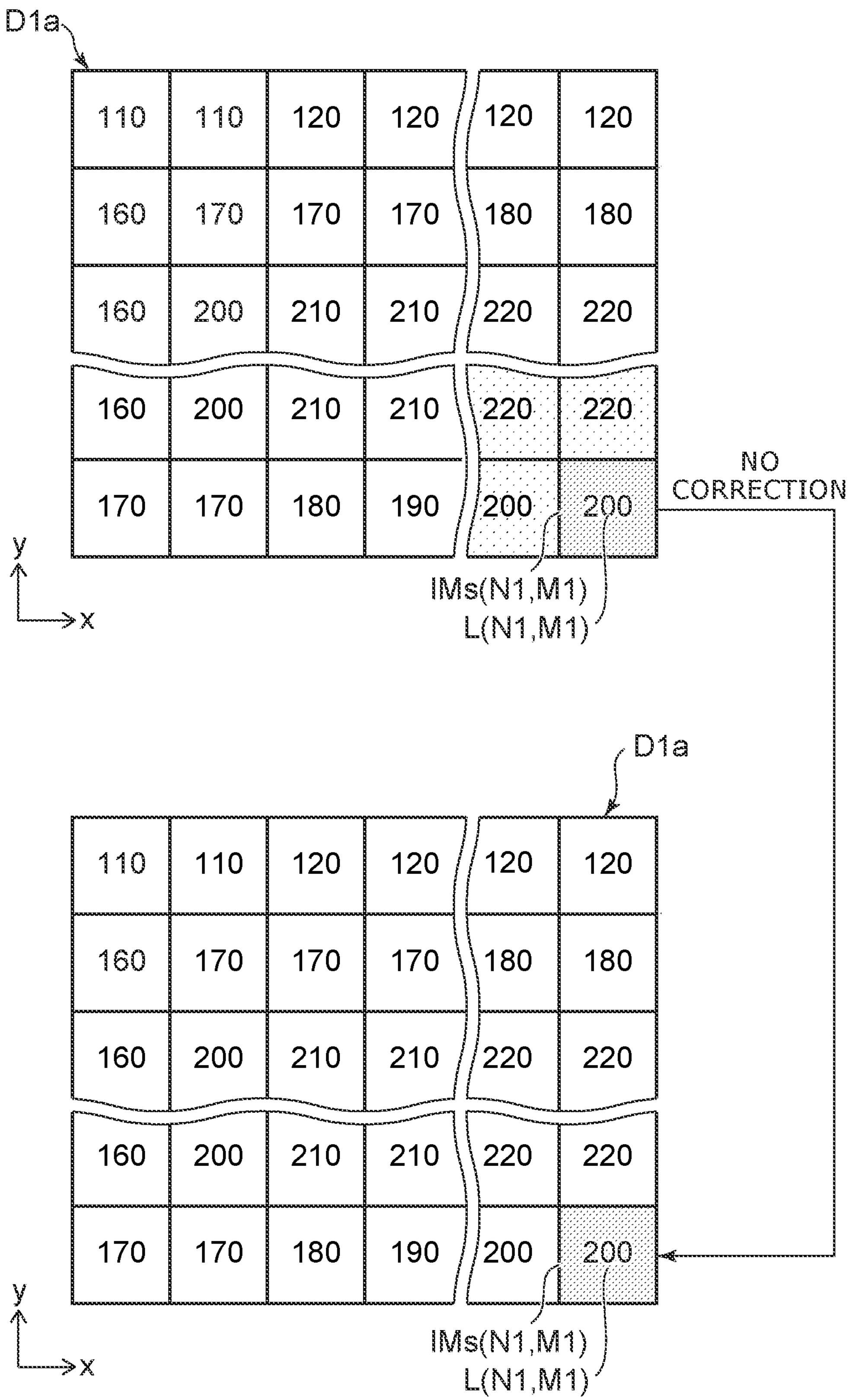

In this manner, the luminance setting data generator 153*b* sequentially shifts the selected area IMs in the x-direction and/or the y-direction and performs the processing of the processes S31 to S35 or the processes S31 to S33 and S36 for each shift. Then, finally, as shown in FIG. 14B, the luminance setting data generator 153*b* performs the processing of the processes S31 to S35 or the processes S31 to S33 and S36 for the area IMs(N1, M1) at the N1th row and the M1th column.

Figure 15A:
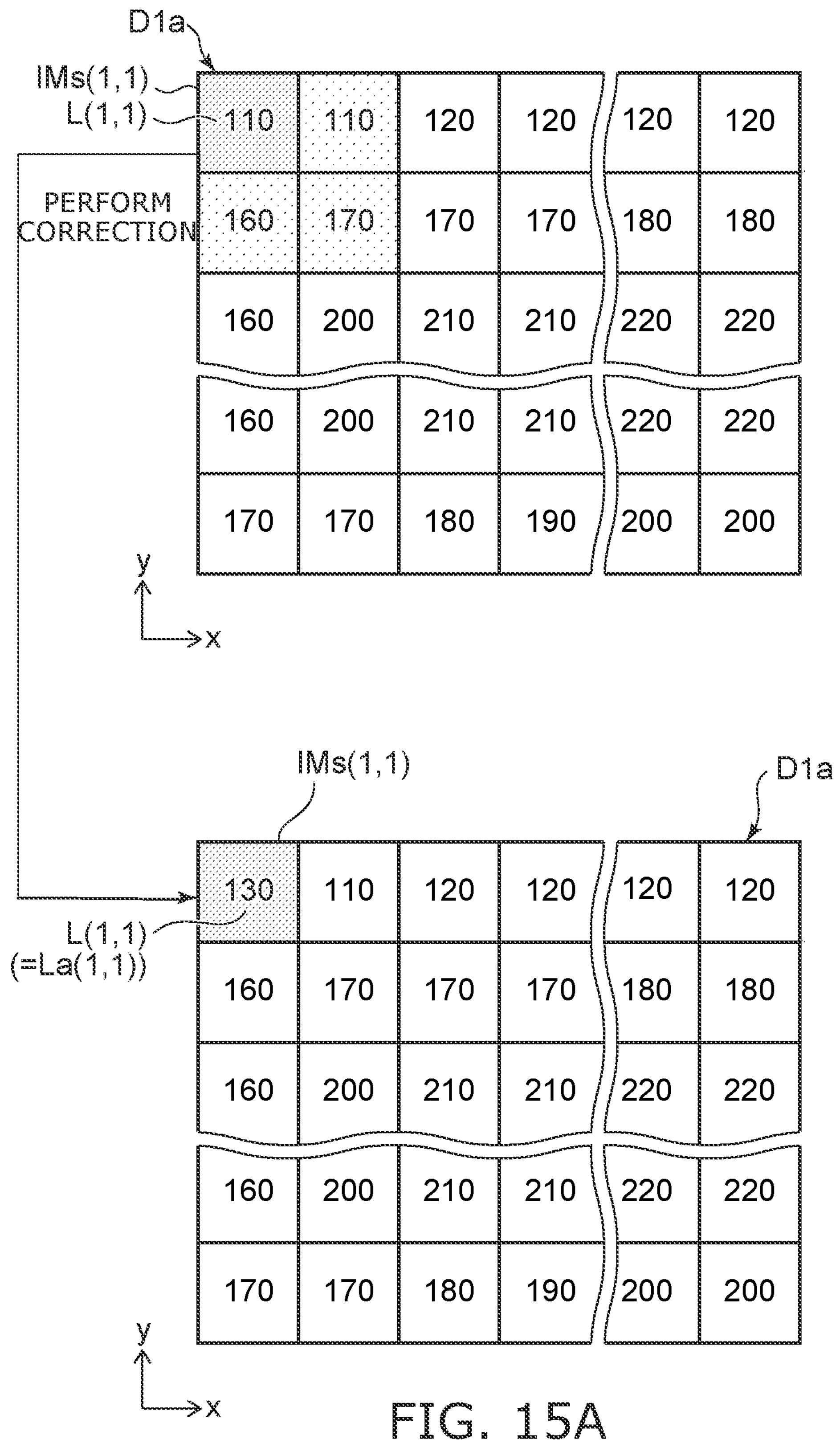
FIGS. 15A and 15B are schematic diagrams showing another part of the process of generating the luminance setting data in the image display method according to the first embodiment.

When only one cycle for all of the areas IMs from the area IMs(1, 1) to the area IMs(N1, M1) of the corrected data D1*a* has been performed, the luminance difference ΔL may be still greater than the threshold ΔLdet for some of the areas IMs as in the area IMs(1, 1) and the area IMs(2, 2) of FIG. 15A.

Figure 15B:
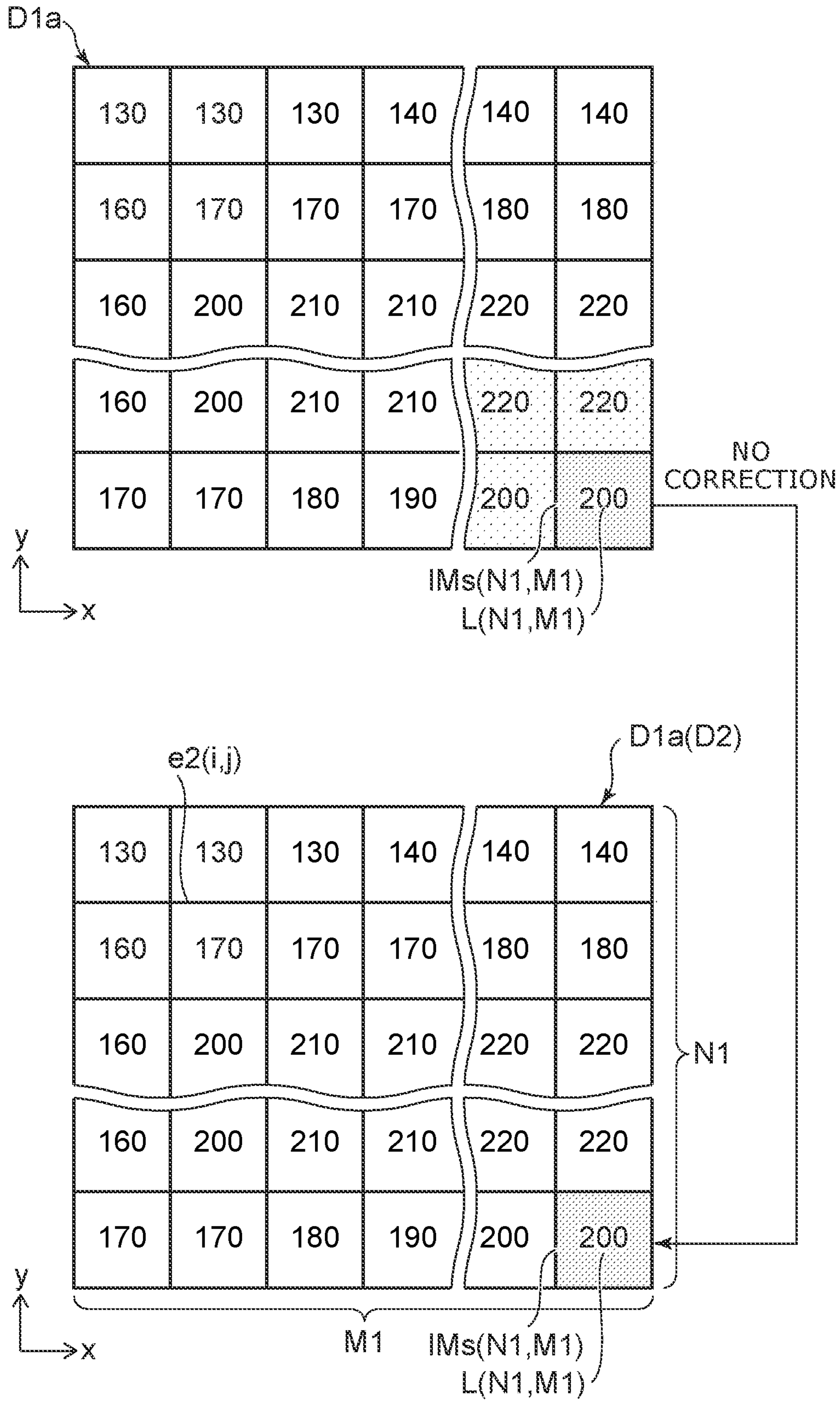

To address such an issue, according to the present embodiment, as shown in FIGS. 15A and 15B, the luminance setting data generator 153*b* again sequentially selects the areas IMs(1, 1) from the area IMs(1, 1) to the area IMs(N1, M1) and iteratively performs the processing of the processes S31 to S35 or the processes S31 to S33 and S36 for each area IMs. In other words, two cycles are performed for all of the areas IMs from the area IMs(1, 1) to the area IMs(N1, M1). Thereby, the luminance difference ΔL between the adjacent areas IMs of the corrected data D1*a* that is greater than the threshold ΔLdet can be suppressed.

The luminance setting data generator 153*b* uses the corrected data D1*a* that is finally obtained as the luminance setting data D2.

The luminance setting data D2 thus obtained is data of a matrix configuration of N1 rows and M1 columns. The value of each element e2(*i, j*) of the luminance setting data D2 at the ith row and the jth column corresponds to the setting value of the luminance of the light-emitting region 110*s* positioned at the ith row and the jth column.

Then, the luminance setting data generator 153*b* stores the luminance setting data D2 in the memory 152.

As described above, the luminance setting data generator 153*b* generates the luminance setting data D2 including the setting values of the luminances of the light-emitting regions 110*s* of the backlight 110 by correcting the luminance data D1 to reduce the luminance difference ΔL by increasing the luminance L of the area IMs that has a lower luminance L among the adjacent areas IMs when the luminance difference ΔL is greater than the threshold ΔLdet. As a result, the luminance difference ΔL between the adjacent areas IMs of the luminance setting data D2 can be less than the threshold ΔLdet. The halo phenomenon that is visible to the user of the image display device 100 can be suppressed thereby.

Although an example of the process of generating the luminance setting data D2 is described above, the process of generating the luminance setting data is not limited to that described above. For example, the sequence of selecting the area IMs in the luminance data D1 or the corrected data D1*a* is not limited to the aforementioned sequence. Depending on the sequence of selecting the area IMs, the luminance difference ΔL may not become more than the threshold ΔLdet for all areas IMs for which the processing of the processes S34 and S35 has been performed once. In such a case, the processing of the processes S31 to S35 or the processes S31 to S33 and S36 may be performed only once for each area IMs.

The generation process S4 of the gradation setting data D3 will now be described.

Figure 16:
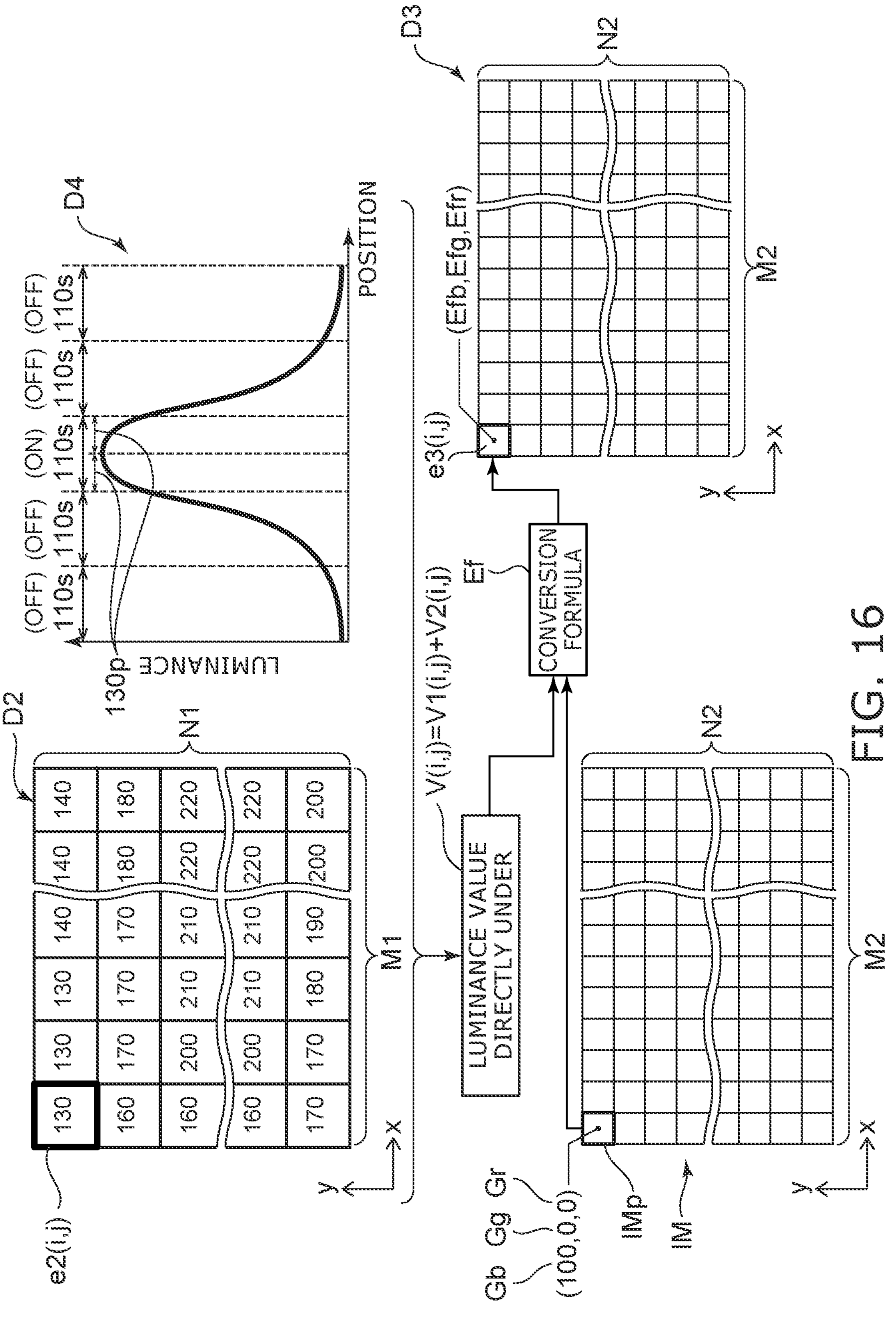
FIG. 16 is a schematic diagram showing a process of generating gradation setting data in the image display method according to the first embodiment.

FIG. 16 is a schematic diagram showing a process of generating gradation setting data in the image display method according to the first embodiment.

The gradation setting data generator 153*c* generates gradation setting data D3 including setting values of the gradations of the pixels 130*p* of the liquid crystal panel 130 based on the input image IM and the luminance setting data D2.

A specific example of the method for generating the gradation setting data D3 will now be described.

According to the present embodiment, the memory 152 pre-stores luminance distribution data D4 indicating luminance distribution in the XY plane when the light source 114 in one light-emitting region 110*s* is lit. Although the setting values of the luminances of the light-emitting regions 110*s* of the backlight 110 are determined in the process S3, actual luminance may be different depending on the position in the XY plane even in one light-emitting region 110*s* as shown in the luminance distribution data D4 of FIG. 15. Also, when the light source 114 in one light-emitting region 110*s* is lit, the light propagates to its neighboring light-emitting regions 110*s* at the periphery of the one light-emitting region 110*s* as described above.

To address such an issue, first, the gradation setting data generator 153*c* estimates a luminance value V(i, j) directly under the pixel 130*p* positioned at the ith row and the jth column of the liquid crystal panel 130 from the luminance setting data D2 and the luminance distribution data D4.

Specifically, the gradation setting data generator 153*c* estimates a luminance value V1(*i, j*) of the luminance setting data D2 directly under the pixel 130*p* when only the light source 114 in the light-emitting region 110*s* positioned directly under the pixel 130*p* is lit from the value of the element e2 (the setting value of the luminance) corresponding to the light-emitting region 110*s* and the data D4. Furthermore, the gradation setting data generator 153*c* estimates a luminance value V2(*i, j*) of the luminance setting data D2 directly under the pixel 130*p* when only the light sources 114 in the neighboring light-emitting regions 110*s* are lit from the values of the elements e2 corresponding to the neighboring light-emitting regions 110*s* and the luminance distribution data D4. Then, the value of the sum of the luminance values V1(*i, j*) and V2(*i, j*) is estimated to be the luminance value V(i, j) directly under the pixel 130*p*. Thereby, the gradation setting data generator 153*c* can estimate the luminance value V(i, j) directly under the pixel 130*p* by including both the luminance distribution in the one light-emitting region 110*s* and the light leakage from the neighboring light-emitting regions 110*s*.

Then, the gradation setting data generator 153*c* inputs the estimated luminance value V(i, j) and the blue gradation Gb of the pixel Imp of the input image IM corresponding to the pixel 130*p*(i, j) into a conversion formula Ef. The conversion formula Ef is, for example, a conversion formula that converts the luminance into a gradation such as a gamma correction conversion formula, etc. The gradation setting data generator 153*c* uses an output value Efb of the conversion formula Ef generated by inputting the blue gradation Gb into the conversion formula Ef as the setting value of the blue gradation of the pixel 130*p*. Similar processing is performed also for the green gradation Gg; and an output value Efg of the conversion formula Ef obtained thereby is used as the setting value of the green gradation of the pixel 130*p*. The gradation setting data generator 153*c* performs similar processing also for the red gradation Gr; and an output value Efr of the conversion formula Ef obtained thereby is used as the setting value of the red gradation of the pixel 130*p*. The gradation setting data generator 153*c* uses the output values Efb, Efg, and Efr of the conversion formula Ef as the values of an element e3(*i, j*) at the ith row and the jth column of the gradation setting data D3.

The gradation setting data generator 153*c* performs this processing for each pixel 130*p* of the liquid crystal panel 130. The gradation setting data D3 is generated thereby.

The gradation setting data D3 thus obtained is data of a matrix configuration of N2 rows and M2 columns. The three values of Efb, Efg, and Egr of the element e3(*i, j*) at the ith row and the jth column of the gradation setting data D3 correspond respectively to the setting value of the blue gradation, the setting value of the green gradation, and the setting value of the red gradation of the pixel 130*p* positioned at the ith row and the jth column of the liquid crystal panel 130.

The gradation setting data generator 153*c* stores the gradation setting data D3 in the memory 152.

Although an example of the process of generating the gradation setting data D3 is described above, the process of generating the gradation setting data is not limited to that described above. For example, the luminance values may be input into the conversion formula after estimating the luminance values directly under all pixels of the liquid crystal panel.

The display process S5 of the image will now be described.

The control unit 153*d* causes the liquid crystal panel 130 to display the image by controlling the backlight 110 based on the luminance setting data D2 and by controlling the liquid crystal panel 130 based on the gradation setting data D3.

Specifically, as shown in FIG. 5, the control unit 153*d* transmits the backlight control data SG1 generated based on the luminance setting data D2 to the driver 120 for the backlight via the output interface 154. The backlight control data SG1 is, for example, data of a PWM (Pulse Width Modulation) format, but is not particularly limited as long as the driver 120 for the backlight can operate based on the data. The driver 120 for the backlight controls the light emission of the light sources 114 based on the backlight control data SG1.

Also, the control unit 153*d* transmits the gradation setting data D3, which is the liquid crystal panel control data SG2, to the driver 140 for the liquid crystal panel via the output interface 154. Alternatively, the liquid crystal panel control data SG2 may be data converted from the gradation setting data D3 into a format that enables the driving of the driver 140 for the liquid crystal panel. The driver 140 for the liquid crystal panel controls the pixels 130*p*, and more specifically, light transmittances for the light of the subpixels 130*sp* based on the liquid crystal panel control data SG2.

The timing of converting the luminance setting data D2 into the backlight control data SG1 is not particularly limited as long as the timing is in or after the process S3. When converting the gradation setting data D3 into the liquid crystal panel control data SG2, the timing of the conversion is not particularly limited as long as the timing is in or after the process S4.

Effects of the first embodiment will now be described.

The image display method according to the first embodiment includes the process S2 of generating the luminance data D1, the process S3 of generating the luminance setting data D2, the process S4 of generating the gradation setting data D3, and the process S5 of displaying the image in the liquid crystal panel 130.

The backlight 110 includes the multiple light-emitting regions 110*s* arranged in a matrix configuration. The liquid crystal panel 130 includes the multiple pixels 130*p*. The input image IM is input to the controller 150 of the image display device 100.

In the process S2, the luminance data D1 including the luminance L converted from the maximum gradation Gmax of an area Ims of the input image IM for each of the areas Inns corresponding to the light-emitting regions 110*s* of the backlight 110 is generated.

In the process S3, the luminance setting data D2 including the setting values of the luminances of the light-emitting regions 110*s* of the backlight 110 is generated by correcting the luminance data D1 to reduce the luminance difference ΔL by increasing the luminance L of the area Inns that has a lower luminance L when the luminance difference ΔL is greater than the threshold ΔLdet.

In the process S4, the gradation setting data D3 including the setting values of the gradations of the pixels 130*p* of the liquid crystal panel 130 is generated based on the luminance setting data D2 and the input image IM.

In the process S5, the image is displayed on the liquid crystal panel 130 by controlling the backlight 110 based on the luminance setting data D2 and by controlling the liquid crystal panel 130 based on the gradation setting data D3.

In such a manner, in the image display method according to the first embodiment, the luminance data D1 is corrected to reduce the luminance difference ΔL between the adjacent areas Inns. Therefore, compared to the case where the backlight 110 is controlled based on the luminance data D1 as is, according to the first embodiment, the difference between the setting values of the luminances of the adjacent light-emitting regions 110*s* of the backlight can be reduced. As a result, the halo phenomenon can be suppressed.

If, for example, a correction is performed to reduce the luminance L of the area Ims that has a higher luminance L among the adjacent areas Ims to reduce the luminance difference ΔL, the backlight 110 becomes darker. When the backlight 110 becomes darker, the gradation difference of the input image IM may no longer be sufficiently represented on the liquid crystal panel 130. In contrast, according to the first embodiment, a correction is performed to increase the luminance L of the area Ims that has a lower luminance L among the adjacent areas Ims to reduce the luminance difference ΔL. As a result, the backlight 110 becomes brighter. Therefore, the liquid crystal panel 130 easily expresses the gradation difference of the input image IM compared to the case where the correction is performed to reduce the luminance L of the area Inns that has a higher luminance L among the adjacent areas Inns to reduce the luminance difference ΔL.

In the process S3 of generating the luminance setting data D2, the difference ΔLo between the threshold ΔLdet and the luminance difference ΔL is added to the luminance L of the area Inns that has a lower luminance L when the luminance difference ΔL between the adjacent areas Inns of the luminance data D1 is greater than the threshold ΔLdet. Thereby, the difference between the setting values of the luminances of the adjacent light-emitting regions 110*s* can be not more than the threshold ΔLdet. As a result, the halo phenomenon can be suppressed.

The image display device 100 according to the first embodiment includes: the backlight 110 including the planar light source 111 that includes the multiple light-emitting regions 110*s* arranged in a matrix configuration and includes the light sources 114 located in the multiple light-emitting regions 110*s*; the liquid crystal panel 130 that is positioned on the backlight 110 and includes the multiple pixels 130*p*; and the controller 150 controlling the backlight 110 and the liquid crystal panel 130. The controller 150 includes the luminance data generator 153*a*, the luminance setting data generator 153*b*, the gradation setting data generator 153*c*, and the control unit 153*d*.

The luminance data generator 153*a* generates the luminance data D1 by converting the maximum gradation Gmax of an area Ims of the input image IM into the luminance L for each of the areas Ims corresponding to the light-emitting regions 110*s* of the backlight 110.

The luminance setting data generator 153*b* generates the luminance setting data D2 including the setting values of the luminances of the light-emitting regions 110*s* of the backlight 110 by correcting the luminance data D1 to reduce the luminance difference ΔL by increasing the luminance L of the area Ims that has a lower luminance L among the adjacent areas Ims when the luminance difference ΔL is greater than the threshold ΔLdet.

The gradation setting data generator 153*c* generates the gradation setting data D3 including the setting values of the gradations of the pixels 130*p* of the liquid crystal panel 130 based on the luminance setting data D2 and the input image IM.

The control unit 153*d* displays the image on the liquid crystal panel 130 by controlling the backlight 110 based on the luminance setting data D2 and by controlling the liquid crystal panel 130 based on the gradation setting data D3.

As a result, compared to the case where the backlight 110 is controlled based on the luminance data D1 as is, according to the first embodiment, the difference between the setting values of the luminances of the adjacent light-emitting regions 110*s* of the backlight can be reduced. As a result, the halo phenomenon can be suppressed.

Second Embodiment

A second embodiment will now be described.

Figure 17:
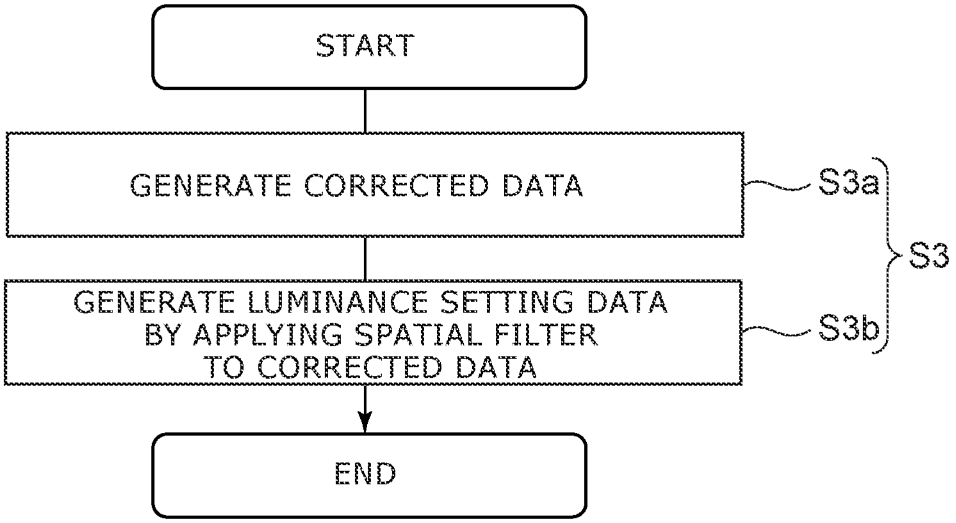
FIG. 17 is a flowchart showing a process of generating luminance setting data in an image display method according to a second embodiment.

FIG. 17 is a flowchart showing a process of generating luminance setting data in an image display method according to the second embodiment.

The image display method according to the second embodiment differs from the image display method according to the first embodiment in that a luminance setting data D22 is generated by applying a spatial filter F to the corrected data D1*a*.

As a general rule in the following description, only the differences from the first embodiment are described. Other than the aspects described below, the second embodiment is similar to the first embodiment.

According to the second embodiment, the process S3 of generating the luminance setting data includes a sub-process S3*a* of generating the corrected data D1*a* in which the luminance difference ΔL is reduced by increasing the luminance L of the area IMs that has a lower luminance L when the luminance difference ΔL is greater than the threshold ΔLdet, and a sub-process S3*b* of generating the luminance setting data D22 by reducing the luminance difference ΔL between the adjacent areas IMs of the corrected data D1*a* by applying the spatial filter F to the corrected data D1*a*. The sub-process S3*a* is the same as the process S3 described in the first embodiment, and a detailed description is therefore omitted.

The sub-process S3*b* will now be elaborated.

Figure 18:
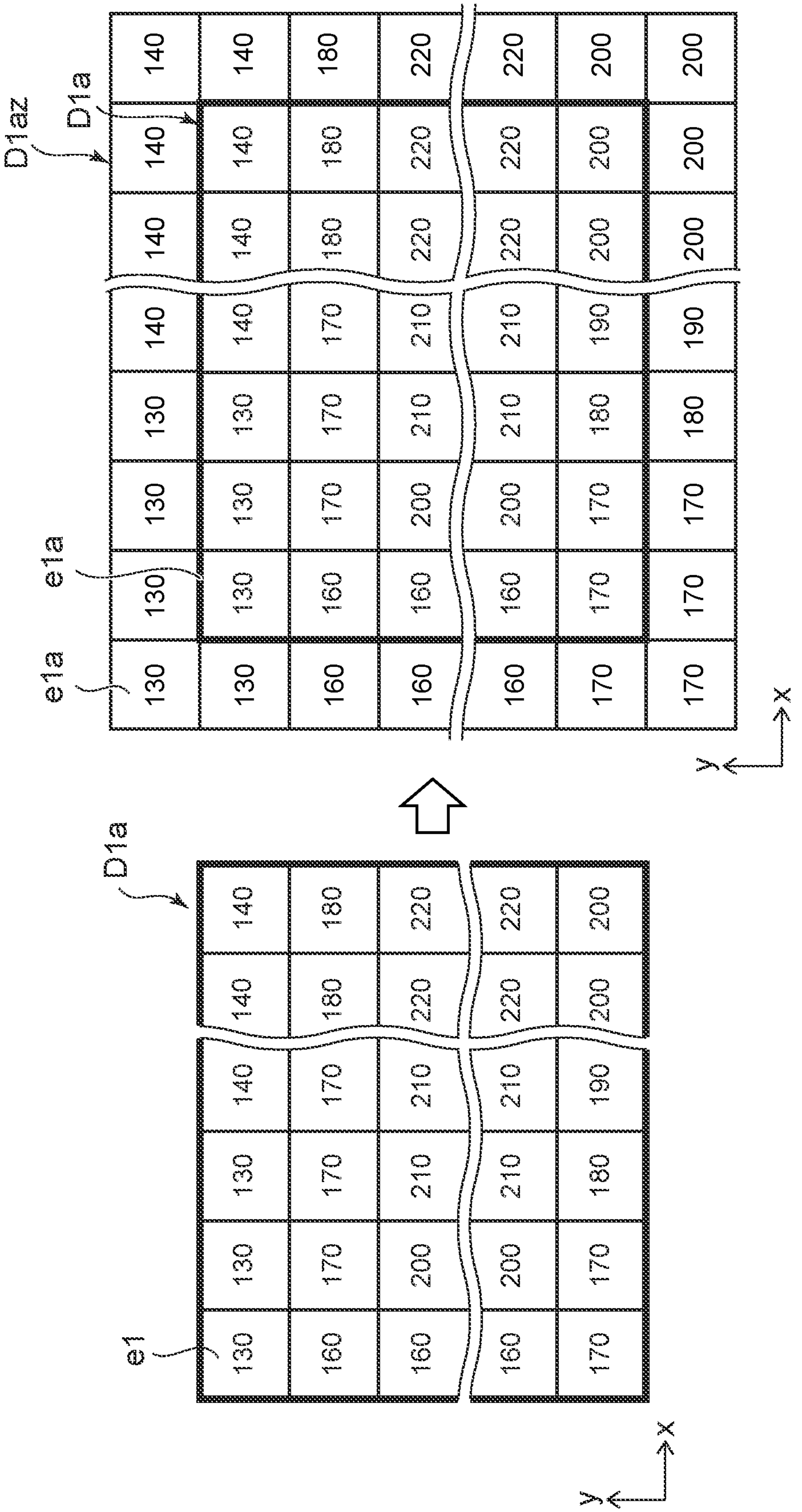
FIG. 18 is a schematic diagram a part of a process of generating the luminance setting data in the image display method according to the second embodiment.
Figure 19:
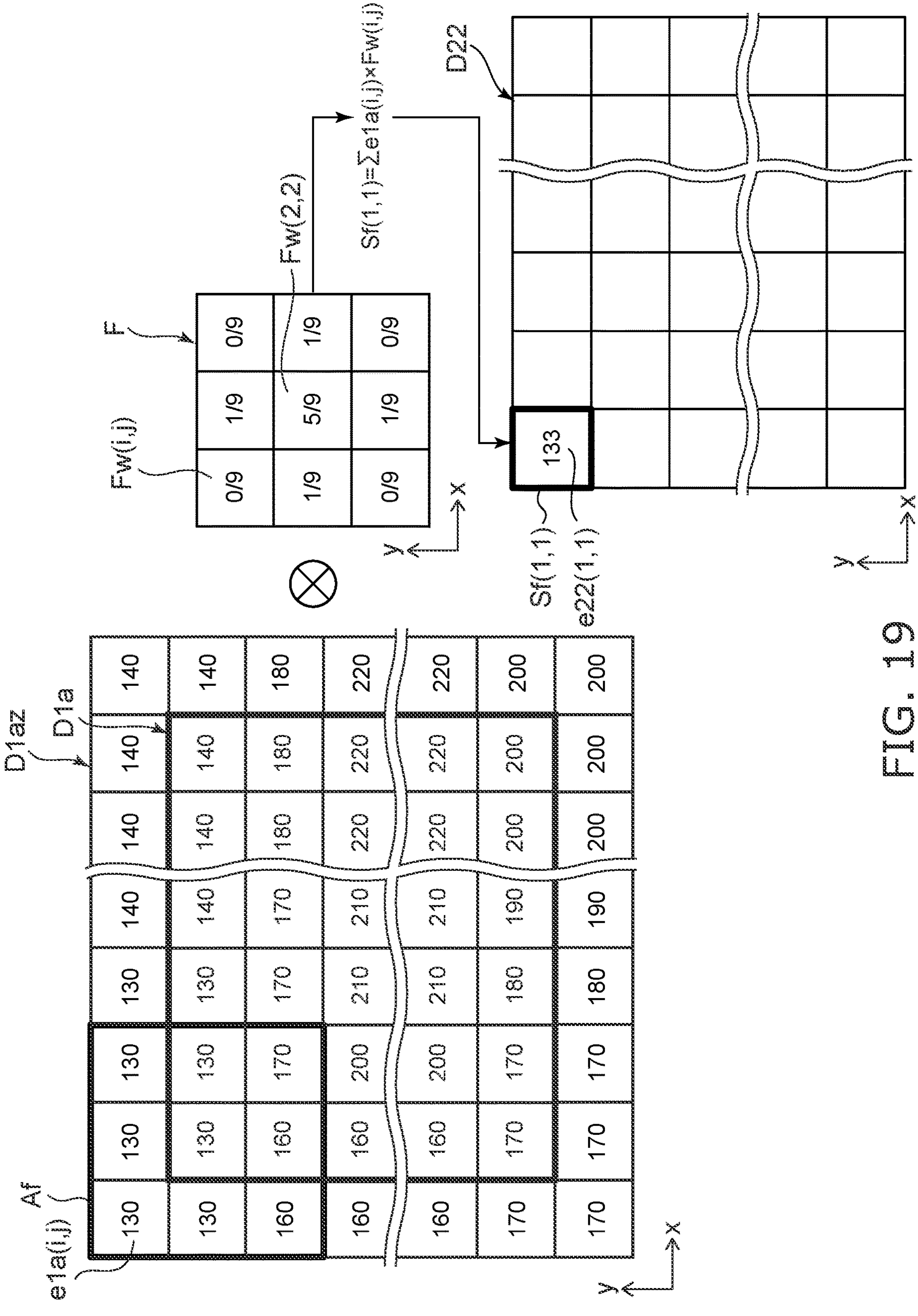
FIG. 19 is a schematic diagram showing another part of the process of generating the luminance setting data in the image display method according to the second embodiment.
Figure 20:
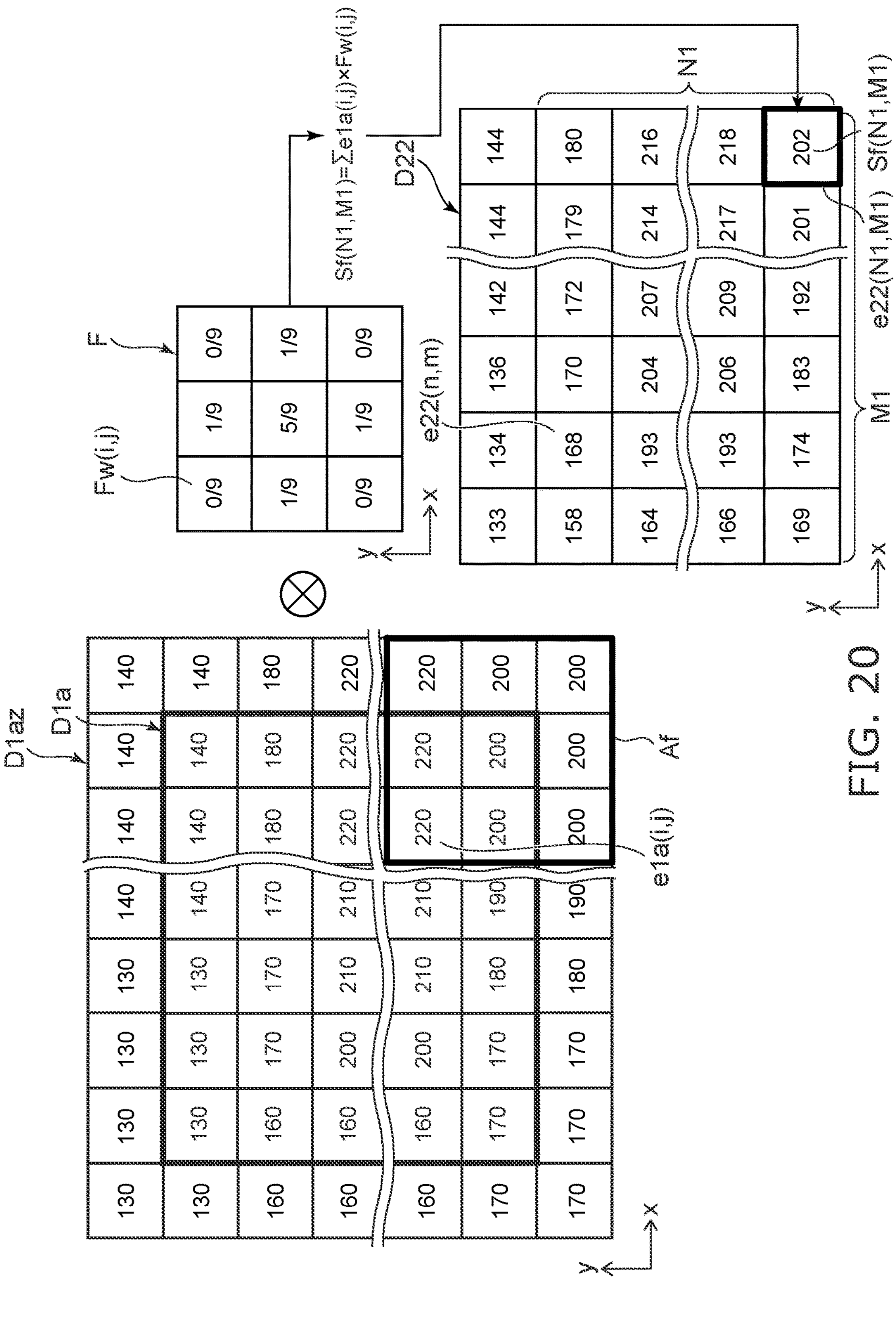
FIG. 20 is a schematic diagram showing another part of the process of generating the luminance setting data in the image display method according to the second embodiment.

FIGS. 18 to 20 are schematic diagrams showing details of the process of generating the luminance setting data in the image display method according to the second embodiment.

As shown in FIG. 20, the luminance setting data generator 153*b* applies the spatial filter F to the corrected data D1*a* that is finally obtained by performing the processing of the processes S31 to S35 or the processes S31 to S33 and S36 as described in the first embodiment for each area IMs of the luminance data D1.

The spatial filter F is prestored in the memory 152. According to the second embodiment, the spatial filter F includes multiple weighting factors Fw arranged in a matrix configuration. Although in an example in the second embodiment the spatial filter F is a matrix of three rows and three columns, the number of rows and the number of columns of the spatial filter F are not limited to the aforementioned numbers. Hereinbelow, the weighting factor Fw at the ith row and the jth column also is called the weighting factor Fw(i, j). Here, i and j each are any integer from 1 to 3.

It is favorable for the value of the weighting factor Fw(2, 2) at the center of the spatial filter F to be greater than the values of the other weighting factors Fw. A Gaussian filter is shown as an example of the spatial filter F in FIGS. 19 and 20 in which the value of the weighting factor Fw(2, 2) at the center is greater than the values of the other weighting factors Fw. However, the values of the weighting factors of the spatial filter are not particularly limited as long as the luminance difference between the adjacent areas can be reduced. For example, the spatial filter may be an averaging filter or a median filter. According to the embodiment, the sum total of the weighting factors Fw is 1.

A specific example of the sub-process of applying the spatial filter F will now be described.

First, as shown in FIG. 18, the luminance setting data generator 153*b* adds elements at the periphery of the corrected data D1*a* so that the values of the elements are equal to the values of the adjacent elements. Thereby, the corrected data D1*a* is enlarged, and the number of rows of the luminance setting data D2 finally obtained can match the number of rows of the light-emitting regions 110*s*. Also, the number of columns of the luminance setting data D2 finally obtained can match the number of columns of the light-emitting regions 110*s*. The corrected data may be enlarged by adding elements of which the values are zero (0) to the periphery. In other words, zero padding of the corrected data may be performed.

Hereinbelow, the enlarged luminance data D1 is called the "post-enlargement corrected data Diaz". Elements of the post-enlargement corrected data Diaz are called "elements e1*a*". The element e1*a* is one of an element of which the value is the luminance L calculated in the process S2, an element of which the value is the value La in which the luminance L calculated in the sub-process S3*a* is corrected, or an added element of which the value is equal to the values of the adjacent elements.

Then, as shown in FIG. 19, the luminance setting data generator 153*b* extracts a region Af that is positioned furthest in the −x direction and furthest in the +y direction in the post-enlargement corrected data Diaz and has the same size as the spatial filter F. Hereinbelow, the element e1*a* at the ith row and the jth column in this region Af is also called the element e1*a*(i, j).

Continuing, the luminance setting data generator 153*b* calculates the product of e1*a*(i, j)×Fw(i, j) in which the element e1*a*(i, j) at the ith row and the jth column in this region Af and the weighting factor Fw(i, j) at the ith row and the jth column of the spatial filter F are multiplied. The luminance setting data generator 153*b* performs the calculation of the product of e1*a*(i, j)×Wf(i, j) for all elements e1*a*(i, j) included in this region Af.

Then, the luminance setting data generator 153*b* calculates a sum Sf(1, 1) of the products of e1*a*(i, j)×Fw(i, j) calculated for one region Af. Thus, for two matrixes such as the region Af and the spatial filter F, the products of the elements at the same positions (coordinates) are calculated, and the sum of the calculated products is called the "multiply-add operation".

Next, the luminance setting data generator 153*b* uses the sum Sf(1, 1) as the value of an element e22(1, 1) at the first row and the first column of the luminance setting data D22.

Then, likewise, the luminance setting data generator 153*b* sequentially shifts the region Af in the +x direction and performs the multiply-add operation for each shift. When the region Af is positioned furthest in the +x direction, the luminance setting data generator 153*b* shifts the region Af one row in the −y direction and furthest in the −x direction, and performs the multiply-add operation. Then, the luminance setting data generator 153*b* again shifts the region Af one column at a time in the +x direction and performs the multiply-add operation for each shift. Thus, the luminance setting data generator 153*b* sequentially shifts the region Af in the x-direction and/or the y-direction and performs the multiply-add operation for each shift.

Finally, as shown in FIG. 20, the region Af subjected to the multiply-add operation is positioned furthest in the +x direction and furthest in the −y-direction. Then, the luminance setting data generator 153*b* performs the multiply-add operation of the element e1*a*(i, j) included in this region Af and the weighting factor Fw(i, j) of the spatial filter F. The sum Sf(N1, M1) is calculated thereby. Then, the luminance setting data generator 153*b* uses the sum Sf(N1, M1) as the value of an element e22(N1, M1) at the final row and the final column of the luminance setting data D22.

The luminance setting data D22 thus obtained is data of a matrix configuration of N1 rows and M1 columns. The value of each element e22(*n, m*) of the luminance setting data D22 at the nth row and the mth column corresponds to the setting value of the luminance of the light-emitting region 110*s* positioned at the nth row and the mth column.

Then, the luminance setting data generator 153*b* stores the luminance setting data D22 in the memory 152.

In the image display method according to the second embodiment as described above, the process S3 of generating the luminance setting data D22 includes the sub-process S3*a* of generating the corrected data D1*a* by reducing the luminance difference ΔL by increasing the luminance L of the area IMs that has a lower luminance L when the luminance difference ΔL is greater than the threshold ΔLdet, and the sub-process S3*b* of generating the luminance setting data D22 by reducing the luminance difference ΔL between the adjacent areas IMs of the corrected data D1*a* by applying the spatial filter F to the corrected data D1*a*.

In such a manner, by applying the spatial filter F to the corrected data D1*a*, compared to the case where the backlight 110 is controlled based on the luminance data D1 as is, the difference between the setting values of the luminances of the adjacent light-emitting regions 110*s* of the backlight can be reduced even further. As a result, the halo phenomenon can be suppressed.

For example, the invention can be utilized in the display of a device such as a television, a personal computer, a game machine, etc.

What is claimed is:

1. An image display method comprising:

generating luminance data that comprises data elements of a plurality of rows and columns of a backlight matrix, based on a maximum gradation value among gradation values of image pixels of an input image that correspond to the light-emitting region, wherein each data element indicates a luminance value for a corresponding one of a plurality of light-emitting regions of the backlight;

generating luminance setting data from the luminance data;

generating gradation setting data that sets a gradation value of each of a plurality of pixels of a liquid crystal panel coupled to the backlight for the input image, based on the input image and the luminance setting data; and controlling the backlight to operate based on the luminance setting data, and the liquid crystal panel to operate based on the gradation setting data to display an image corresponding to the input image, wherein said generating luminance setting data comprises:

performing correction of the luminance data, wherein with respect to each of the data elements of the luminance data of which luminance value is less than a maximum luminance value among luminance values of neighboring rows and columns thereof by more than a threshold amount, the luminance value is increased by a certain value such that a difference between the luminance value and the maximum luminance value is decreased to be within the threshold amount, to generate collected luminance data;

enlarging the collected luminance data by expanding rows and columns around rows and columns of the collected luminance data and setting luminance values of the expanded rows and columns, to generate enlarged luminance data; and applying a spatial filter to each of different subsets of the enlarged luminance data, such that, with respect to each of data elements of the enlarged luminance data corresponding to the light-emitting regions, a difference of a luminance value thereof from luminance values of neighboring rows and columns decreases, to generate the luminance setting data, wherein the spatial filter comprises a matrix of weighting factors, and in said applying the spatial filter to each of different subsets of the enlarged luminance data, a sum of a multiplication of each luminance value in the subset with a corresponding one of the weighting factors is calculated, and the calculated sum is set as a luminance setting value for a corresponding light-emitting region of the backlight in the luminance setting data.

2. The image display method according to claim 1, wherein the correction of the luminance data comprises:

performing iterative operations, each of the operations being carried out such that, with respect to each of the data elements of the luminance data of which luminance value is less than a maximum luminance value among luminance values of neighboring rows and columns thereof by more than the threshold amount, the luminance value is increased such that the difference between the luminance value and the maximum luminance value is decreased to be within the threshold amount.

3. The image display method according to claim 1, wherein the correction of the luminance data comprises:

with respect to each of the data elements of the luminance data, determining whether the luminance value thereof is less than the maximum luminance value among the luminance values of the neighboring rows and columns thereof by more than the threshold amount; and upon determining that the luminance value is less than the maximum luminance value by more than the threshold amount, increasing the luminance value by the certain value.

4. The image display method according to claim 3, wherein the certain value is a difference of the luminance value and the maximum luminance value, minus a predetermined value.

5. The image display method according to claim 3, wherein during the correction of the luminance data, with respect to each of the data elements of the luminance data, the luminance value thereof is maintained when the luminance value is determined to be within the predetermined range.

6. The image display method according to claim 1, wherein the neighboring rows and columns of each of the data elements of the luminance data are within one row and one column from the data element.

7. The image display method according to claim 1, wherein the spatial filter includes a Gaussian filter.

8. The image display method according to claim 1, wherein a sum of weighting factors of the spatial filter is one.

9. The image display method according to claim 1, wherein said generating gradation setting data comprises:

generating luminance estimation data that indicates an estimated luminance value of backlight for the input image with respect to each of the pixels of the liquid crystal panel based on the luminance setting data and luminance distribution data indicating a luminance distribution in each of the light-emitting regions of the backlight panel; and performing correction of gradation values of image pixels indicated by the input image using the luminance estimation data to generate the gradation setting data.

10. The image display method according to claim 1, wherein each of the light-emitting regions of the backlight panel corresponds to a plurality of pixels of the liquid crystal panel.

11. The image display method according to claim 1, wherein each of the light-emitting regions of the backlight corresponds to a single light-emitting element.

12. The image display method according to claim 1, wherein the expanded rows and columns are one row added to each of end rows of the collected luminance data and one column added to each of end columns of the collected luminance data, and the matrix of the spatial filter is a three-by-three matrix.

13. A display comprising:

a backlight including a plurality of light-emitting regions that are configured in a matrix form and independently operable;

a liquid crystal panel coupled to the backlight panel and including a plurality of pixels; and a controller configured to:

generate luminance data that comprises data elements of a plurality of rows and columns of the backlight matrix, based on a maximum gradation value among gradation values of image pixels of an input image that correspond to the light-emitting region, wherein each data element indicates a luminance value for a corresponding one of the light-emitting regions of the backlight;

generate luminance setting data from the luminance data;

generating gradation setting data that sets a gradation value of each of the pixels of the liquid crystal panel for the input image, based on the input image and the luminance setting data; and control the backlight to operate based on the luminance setting data, and the liquid crystal panel to operate based on the gradation setting data to display an image corresponding to the input image, wherein in generating the luminance setting data, the controller is configured to:

perform correction of the luminance data, wherein with respect to each of the data elements of the luminance data of which luminance value is less than a maximum luminance value among luminance values of neighboring rows and columns thereof by more than a threshold amount, the luminance value is increased by a certain value such that a difference between the luminance value and the maximum luminance value is decreased to be within the threshold amount, to generate collected luminance data;

enlarge the collected luminance data by expanding rows and columns around rows and columns of the collected luminance data and setting luminance values of the expanded rows and columns, to generate enlarged luminance data; and apply a spatial filter to each of different subsets of the enlarged luminance data, such that, with respect to each of data elements of the enlarged luminance data corresponding to the light-emitting regions, a difference of a luminance value thereof from luminance values of neighboring rows and columns decreases, to generate the luminance setting data, wherein the spatial filter comprises a matrix of weighting factors, and in applying the spatial filter to each of different subsets of the enlarged luminance data, the controller is configured to calculate a sum of a multiplication of each luminance value in the subset with a corresponding one of the weighting factors, and set the calculated sum as a luminance setting value for a corresponding light-emitting region of the backlight in the luminance setting data.

14. The display according to claim 13, wherein the controller is configured to perform, during the correction of the luminance data, iterative operations, each of the operations being carried out such that, with respect to each of the data elements of the luminance data of which luminance value is less than a maximum luminance value among luminance values of neighboring rows and columns thereof by more than the threshold amount, the luminance value is increased such that the difference between the luminance value and the maximum luminance value is decreased to be within the threshold amount.

15. The display according to claim 13, wherein the controller is configured to, during the correction of the luminance data:

with respect to each of the data elements of the luminance data, determine whether the luminance value thereof is less than the maximum luminance value among the luminance values of the neighboring rows and columns thereof by more than the threshold amount; and upon determining that luminance value is less than the maximum luminance value by more than the threshold amount, increase the luminance value by the certain value.

16. The display according to claim 15, wherein the certain value is a difference of the luminance value and the maximum luminance value, minus a predetermined value.

17. The display according to claim 15, wherein during the correction of the luminance data, with respect to each of the data elements of the luminance data, the luminance value thereof is maintained when the luminance value is determined to be within the predetermined range.

18. The display according to claim 13, wherein the neighboring rows and columns of each of the data elements of the luminance data are within one row and one column from the data element.

19. The display according to claim 13, wherein the spatial filter includes a Gaussian filter.

20. The display according to claim 13, wherein the expanded rows and columns are one row added to each of end rows of the collected luminance data and one column added to each of end columns of the collected luminance data, and the matrix of the spatial filter is a three-by-three matrix.

* * * * *